United States Patent
Marchini et al.

(10) Patent No.: US 12,516,381 B2
(45) Date of Patent: Jan. 6, 2026

(54) METHOD FOR PREDICTING THE CLINICAL RESPONSE OF ONCOLYTIC PARVOVIRUS H1 (H-1PV) TREATMENT IN A PATIENT SUSPECTED OF SUFFERING FROM CANCER BY MEASURING THE EXPRESSION LEVELS OF LAMININS AND/OR GALECTINS AS BIOMARKERS IN A PATIENT'S SAMPLE

(71) Applicant: DEUTSCHES KREBS-FORSCHUNGSZENTRUM STIFTUNG DES ÖFFENTLICHEN RECHTS, Heidelberg (DE)

(72) Inventors: Antonio Marchini, Luxembourg (LU); Amit Kulkarni, Heidelberg (DE); Annabel Grewenig, Heidelberg (DE); Jean Rommelaere, Heidelberg (DE); Tiina Marttila, Karlsruhe (DE); Tiago Ferreira, Heidelberg (DE)

(73) Assignee: DEUTSCHES KREBSFORSCHUNGSZENTRUM STIFTUNG DES ÖFFENTLICHEN RECHTS, Heidelberg (DE)

( * ) Notice: Subject to any disclaimer, the term of this patent is extended or adjusted under 35 U.S.C. 154(b) by 1089 days.

(21) Appl. No.: 17/307,236

(22) Filed: May 4, 2021

(65) Prior Publication Data
US 2021/0340630 A1  Nov. 4, 2021

Related U.S. Application Data

(63) Continuation-in-part of application No. PCT/EP2019/081368, filed on Nov. 14, 2019.

(30) Foreign Application Priority Data

Nov. 22, 2018  (EP) ..................... 18207749

(51) Int. Cl.
*C12Q 1/6886* (2018.01)

(52) U.S. Cl.
CPC ..... *C12Q 1/6886* (2013.01); *C12Q 2600/106* (2013.01); *C12Q 2600/158* (2013.01)

(58) Field of Classification Search
None
See application file for complete search history.

(56) References Cited

U.S. PATENT DOCUMENTS

| | | | |
|---|---|---|---|
| 2004/0063120 A1* | 4/2004 | Beer | G01N 33/57423 435/6.14 |
| 2013/0065242 A1 | 3/2013 | Burkin et al. | |
| 2014/0212415 A1 | 7/2014 | Gutin et al. | |
| 2016/0109453 A1 | 4/2016 | Weinhausel | |

FOREIGN PATENT DOCUMENTS

| | | |
|---|---|---|
| JP | 2013-524823 A | 6/2013 |
| WO | 2018/096072 A1 | 5/2018 |

OTHER PUBLICATIONS

Cobb et al (Crit Care Med 2002 vol. 30 p. 2711) (Year: 2002).*
Enard et al. (Science 2002 vol. 296 p. 340) (Year: 2002).*
Jeannine Lacroix, et al., Oncolytic effects of parvovirus H-1 in 1nedulloblastoma are associated with repression of master regulators of early neurogenesis, International Journal of Cancer (2014) 134, 703-716.
L Krüger, et al., Augmented trans gene expression in transformed cells using a parvoviral hybrid vector, Cancer Gene Therapy (2008) 15, 252-267.
Bassel Akache, et al., The 37/67-Kilodalton Laminin Receptor Is a Receptor for Adeno-Associated Virus Serotypes 8, 2, 3, and 9, Journal of Virology (Oct. 2006) vol. 80, No. 19, p. 9831-9836.
Sebastian Dempe, et al., SMAD4: a predictive marker of PDAC cell permissiveness for oncolytic infection with parvovirus H-1 PV, International Journal of Cancer (2010) vol. 126, p. 2914-2927.

* cited by examiner

*Primary Examiner* — Katherine D Salmon
(74) *Attorney, Agent, or Firm* — Duane Morris LLP; Thomas J. Kowalski

(57) ABSTRACT

The present invention concerns the use of laminins and/or galectins as biomarker(s) for predicting the outcome of the treatment with oncolytic parvovirus H1 (H-1 PV) in a cancer patient.

9 Claims, 21 Drawing Sheets

Figures 2A, 2B:
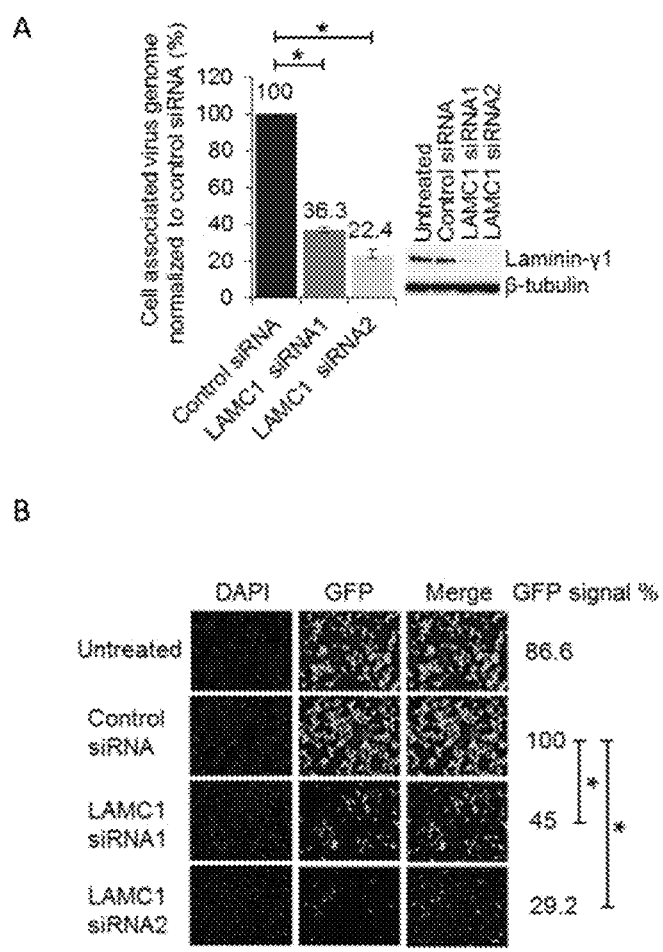

Specification includes a Sequence Listing.

Figure 1A-1C
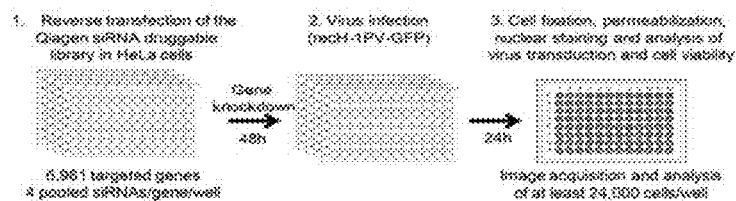
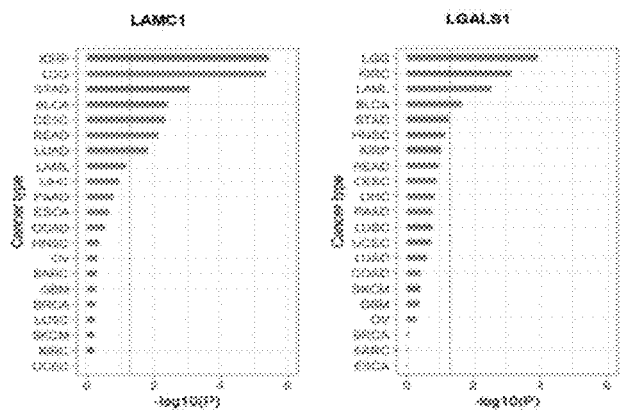

A

B

C

Figure 8

| | DAPI | GFP | Merge | % GFP signal |
|---|---|---|---|---|
| Untreated | | | | 100 |
| Neuraminidase | | | | 0 |
| Fibronectin | | | | 111.3 |
| Laminin 332 | | | | 73 |
| Laminin 111 | | | | 21.7 |
| Laminin 121 | | | | 45.2 |
| Laminin 211 | | | | 53.9 |
| Laminin 221 | | | | 44.3 |
| Laminin 411 | | | | 46.1 |
| Laminin 421 | | | | 41.7 |
| Laminin 511 | | | | 40.9 |
| Laminin 521 | | | | 58.3 |

Example of sensitive cancer cell line: SNB-75

Example of resistant cancer cell line: COLO205

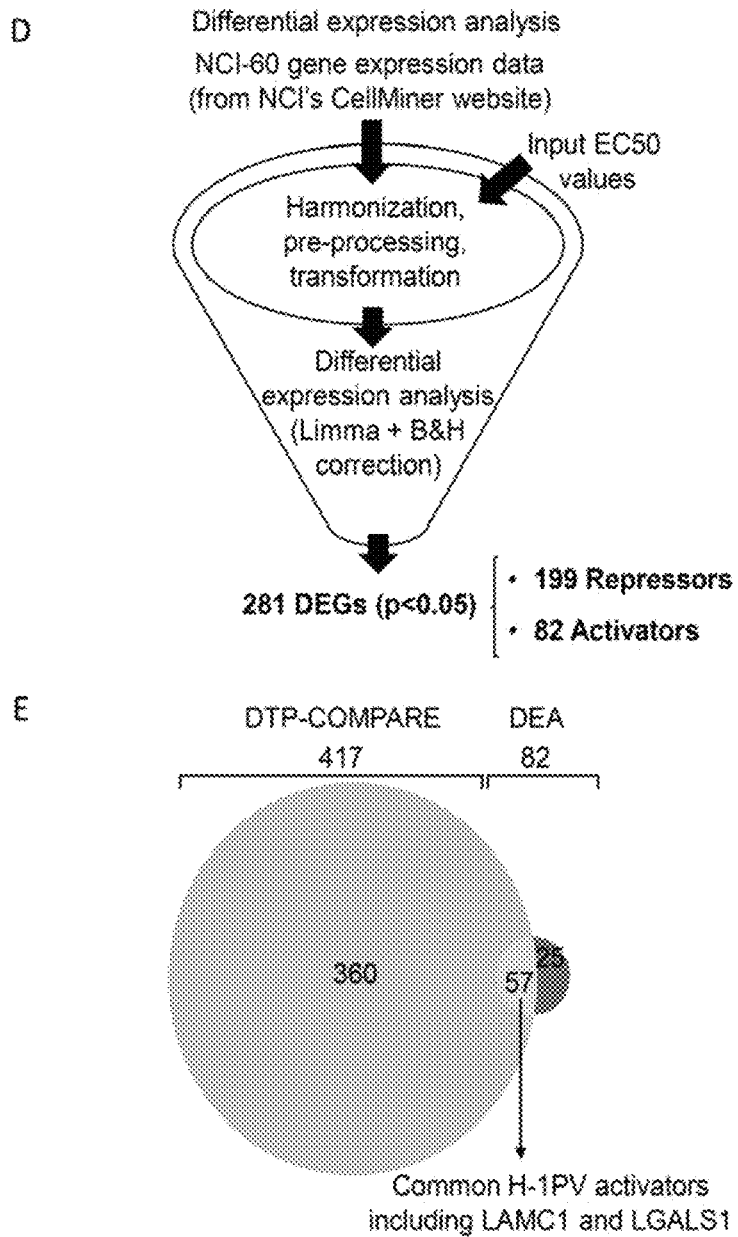

A

B

METHOD FOR PREDICTING THE CLINICAL RESPONSE OF ONCOLYTIC PARVOVIRUS H1 (H-1PV) TREATMENT IN A PATIENT SUSPECTED OF SUFFERING FROM CANCER BY MEASURING THE EXPRESSION LEVELS OF LAMININS AND/OR GALECTINS AS BIOMARKERS IN A PATIENT'S SAMPLE

This application is a continuation-in-part application of international patent application Serial No. PCT/EP2019/081368 filed Nov. 14, 2019, which published as PCT Publication No. WO 2020/104294 on May 28, 2020, which claims benefit of priority to European patent application Serial No. 18207749.5 filed Nov. 22, 2018.

The foregoing applications, and all documents cited therein or during their prosecution ("appln cited documents") and all documents cited or referenced in the appln cited documents, and all documents cited or referenced herein ("herein cited documents"), and all documents cited or referenced in herein cited documents, together with any manufacturer's instructions, descriptions, product specifications, and product sheets for any products mentioned herein or in any document incorporated by reference herein, are hereby incorporated herein by reference, and may be employed in the practice of the invention. More specifically, all referenced documents are incorporated by reference to the same extent as if each individual document was specifically and individually indicated to be incorporated by reference.

SEQUENCE STATEMENT

The instant application contains a Sequence Listing, which has been submitted electronically and is hereby incorporated by reference in its entirety. Said ASCII copy, is named Y800500019SL.txt and is 2.47 kb in size.

FIELD OF THE INVENTION

The present invention concerns the use of laminins and/or galectins as biomarker(s) for predicting the outcome of the treatment with oncolytic parvovirus H1 (H-1PV) in a cancer patient.

BACKGROUND OF THE INVENTION

Oncolytic viruses are well known expression vectors for transgenes. Several years ago the augmented transgene expression in transformed cells using a parvovirus hybrid vector has been reported.[33]

Oncolytic Viruses (OVs) selectively replicate in and destroy tumour cells without harming normal healthy tissues[1,2]. They act in a multimodal fashion. Virus cancer cell infection and multiplication is followed by oncolysis which is associated with the release of progeny virus particles into the tumour microenvironment. These particles can infect neighbouring cancer cells leading to second rounds of lytic infection, resulting in self-amplification of the local antitumour effect. Besides, the direct killing activity, OVs are also able to induce anticancer immunity[3,4]. Indeed, virus mediated cancer cell killing is often immunogenic, accompanied by the release of tumour associated antigens, danger-associated molecular and pathogen patterns (DAMPs and PAMPs) that stimulate the recruitment of immune cells into the tumour bed leading to immunoconversion of the tumour microenvironment. Activated immune cells participate in the elimination of cancer cells even those not directly infected by OVs (e.g. small disseminated metastases)[5]. As results of their anticancer activity not less than 40 different oncolytic viruses belonging to at least nine different virus families are presently being tested in early or late phases of clinical trials against various malignancies. One critical milestone was achieved in 2015 with marketing approval, granted in US and Europe, for an engineered herpes simplex virus (HSV) encoding GM-CSF (talimogene laherparepvec, T-Vec, Imlygic™) against malignant metastatic melanoma[6]. There is a justified optimism that other OVs may be approved in the near future for the treatment of other cancers[7]. However, OVs as a standing alone therapy have been rarely reported to induce the complete regression of tumours. Major efforts to improve OVs clinical outcome are directed towards the search of other anticancer modalities synergising with OVs in killing cancer cells without the insurgence of toxic side-effects. One very promising avenue, is the combination of OVs with other forms of immunotherapy (e.g. checkpoint blockade)[5]. On the other hand, the selection of those patients most likely benefiting from OV treatment because their tumour genetic characteristics are favourable to the virus life cycle, would also improve clinical outcome and lead to the design of "smart" clinical trials reducing clinical costs and approval time. A better understanding of the virus life cycle with the identification of cellular determinants modulating the various steps of virus infection is crucial to guide both the rational design of combination treatments and the identification of biomarkers to be used for patient stratification.

Among the clinically relevant oncolytic viruses, there is the rat parvovirus H-1PV[8]. Its anti-cancer potential has been demonstrated at the preclinical level in a number of in vitro cell systems and animal models. For example, the oncolytic effects of parvovirus H-1 in medulloblastoma cell lines has been reported.[34] Moreover, recent completion of first phase I/IIa trials in patients suffering of recurrent glioblastoma demonstrated that H-1PV treatment as a stand-alone therapy is safe, well tolerated and associated with first evidence of efficacy including (i) ability to cross the blood-brain (tumour) barrier after intravenous delivery (ii) widespread intratumoral distribution and expression (iii) immunoconversion of tumour microenvironment, and (iv) extended median progression free/overall survival in comparison with historical controls[9]. A second clinical study in patients with pancreatic carcinomas is presently in its evaluation phase.

H-1PV is a small non-enveloped, single-stranded DNA virus. Its genome of 5.1 kb is organised into two gene units, a non-structural (NS) and a structural (VP) unit whose expressions are regulated by the P4 and P38 promoters, respectively. The NS gene unit encodes for the NS1, NS2 non-structural proteins whereas the VP unit encodes for the VP1 and VP2 capsid proteins and non-structural SAT protein. NS1 is a multifunctional protein that regulates virus DNA replication and gene transcription and is the major effector of H-1PV oncolysis[10].

PV small genome size provides limited protein coding capacity implying that viral DNA replication and gene expression are strictly dependent on host cellular factors. For instance, it is known that H-1PV replication relies on cellular factors such as E2F, CREB, ATF, and cyclin A[8,10], which are normally overexpressed in fast-proliferating cancer cells and therefore are important determinants of virus oncotropism. In addition, the activity of NS1 is modulated by post-translation modifications such as phosphorylation and acetylation[10,11]. These modifications also contribute to the virus oncotropism because some of the cellular factors involved are up-regulated or altered in cancer cells (e.g.

PRKCH/PKCη which is involved in NS1 phosphorylation[12]). However, many of the cellular factors that play a role in the H-1PV life cycle remain to be identified. For instance, it is largely unknown why some cancer cell lines are very susceptible to H-1PV infection whereas others derived from the same tumour entity are less sensitive or even completely refractory. Cell-host interactions are thought to regulate these differences in permissiveness. Restrictions can occur for instance at the level of virus cell membrane attachment and entry, or virus cytosol trafficking and translocation into the nucleus, all events which govern virus replication and infectivity.

The initial encounter of a virus with the host cell occurs through binding to a single receptor or a receptor complex exposed on the host cell membrane. The recognition of cell surface molecules initiates virus infection and hence represents a key determinant underlying virus tropism and infectivity. While a functional receptor has been identified for some of the members of the Parvoviridae family (e.g. transferrin receptor for the canine and feline parvoviruses; several receptors and attachment factors including the laminin receptor for a number of adeno-associated virus serotypes[32, 35-38]), the receptor (complex) involved in H-1PV cell membrane recognition is still unknown. An essential component displayed on the cell membrane and needed for H-1PV cell attachment was identified earlier to be sialic acid (SA) with two residues mapped on the viral capsid involved in SA interaction[17]. However, it is unclear whether initial attachment to the cells through SA is sufficient to mediate H-1PV cell membrane recognition and entry, or the virus requires additional interaction(s) with protein receptor(s) carrying or not SA, for these events. Following virus cell membrane binding, H-1PV cell entry, based on homology with other members belonging to its genus, is supposed to occur via clathrin-mediated endocytosis[18]. Yet, the specific mechanisms of H-1PV cell entry remain to be deciphered.

Citation or identification of any document in this application is not an admission that such document is available as prior art to the present invention.

OBJECT OF THE PRESENT INVENTION

Thus, the object of the present invention is to identify novel cellular factors involved in H-1PV life cycle with special attention directed towards the identification of the H-1PV cellular (co)receptor(s). Indeed these factors, which need to be present for a successful virus infection, can be used as biomarkers to predict the response of cancer patients to H-1PV treatment.

To date, no validated predictive biomarkers have been identified that correlate with treatment outcomes to H-1PV.

The profiling of biological samples derived from patients involved in clinical trials and subsequent analysis of their genomic/proteomic and clinical data could allow the discovery and potential validation of predictive biomarkers.

Accordingly, it is an object of the invention not to encompass within the invention any previously known product, process of making the product, or method of using the product such that Applicants reserve the right and hereby disclose a disclaimer of any previously known product, process, or method. It is further noted that the invention does not intend to encompass within the scope of the invention any product, process, or making of the product or method of using the product, which does not meet the written description and enablement requirements of the USPTO (35 U.S.C. § 112, first paragraph) or the EPO (Article 83 of the EPC), such that Applicants reserve the right and hereby disclose a disclaimer of any previously described product, process of making the product, or method of using the product. It may be advantageous in the practice of the invention to be in compliance with Art. 53(c) EPC and Rule 28(b) and (c) EPC. All rights to explicitly disclaim any embodiments that are the subject of any granted patent(s) of applicant in the lineage of this application or in any other lineage or in any prior filed application of any third party is explicitly reserved. Nothing herein is to be construed as a promise.

It is noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the invention.

These and other embodiments are disclosed or are obvious from and encompassed by, the following Detailed Description.

OBJECT OF THE PRESENT INVENTION

The following detailed description, given by way of example, but not intended to limit the invention solely to the specific embodiments described, may best be understood in conjunction with the accompanying drawings.

FIG. 1A-1C: siRNA library screening reveals LAMC1 and LGALS1 as modulators of H-1PV life cycle.

A, Protocol design. The complete siRNA Human Druggable Genome library (Qiagen) consisting of 6,961 siRNAs pools (4 siRNAs/pool/gene) was spotted onto 96 well plates (1 pool per well) in triplicate and then reverse transfected in HeLa cells. After 48 h, cells were infected with recombinant H-1PV harbouring the EGFP reporter gene (recH-1PV-EGFP). EGFP signal was quantified 24 h after infection as a measurement of H-1PV transduction efficacy. Internal positive and negative controls were added to each plate to check inter-plate and day-to-day variability as described in Materials and Methods.

B, The siRNA library screening identified LAMC1 and LGALS1 as activators of H-1PV life cycle, C, LAMC1 and LGALS1 are upregulated in a variety of different cancers and represent markers of poor prognosis. The gene expression data and clinical information from The Cancer Genome Atlas (TCGA, cancergenome.nih.gov) was investigated to explore the associations between LAMC1 and LGALS1's gene expressions and patient survival in 21 cancer types. To facilitate visualization, $-\log_{10}$ of the (Cox test) p-values are depicted on the X-axis for each cancer type (Y-axis). The dotted black line indicates the position of p=0.05. LAML: acute myeloid leukemia; BLCA: bladder urothelial carcinoma; LGG: brain lower grade glioma; BRCA: breast invasive carcinoma; CESC: cervical squamous cell carcinoma and endocervical adenocarcinoma; COAD: colon adenocarcinoma; ESCA: esophageal carcinoma; GBM: glioblastoma multiforme; HNSC: head and neck squamous cell carcinoma; KIRC: kidney renal clear cell carcinoma; KIRP: kidney renal papillary cell carcinoma; LIHC: liver hepatocellular carcinoma; LUAD: lung adenocarcinoma; LUSC: lung squamous cell carcinoma; OV: ovarian serous cystadenocarcinoma; PAAD: pancreatic adenocarcinoma; READ: rectum adenocarcinoma; SARC:

sarcoma; SKCM: skin cutaneous melanoma; STAD: stomach adenocarcinoma, UCEC: uterine corpus endometrial carcinoma.

FIG. 2A-2B: Laminin-γ1 is a cellular receptor for H-1PV.

A, Silencing of LAMC1 decreases H-1PV cell uptake. HeLa cells were transfected with control siRNA or two distinct siRNAs targeting two separate regions of LAMC1. At 46 h post-transfection, cells were infected with H-1PV (MOI 1, pfu/cell) for 4 h at 37° C. Cells were harvested and viral DNA was extracted using the QiAamp MinElute Virus Spin kit and then quantified using qPCR as described in Materials and Methods. The results are presented as % of cell associated virus genome normalized to control siRNA. Numbers on top of the columns show average H-1PV uptake values with relative standard deviation bars from triplicate experiments. Western blot analysis ascertained the down-regulation of LAMC1 in siRNAs transfected cells using β-tubulin as a loading control.

B, Silencing of LAMC1 reduces H-1PV transduction. HeLa cells were transfected with the same siRNAs used for panel A. At 46 h post-transfection, cells were infected with recH-1PV-EGFP (1 TU, GFP/cell) and grown for additional 24 h. Cells were then fixed, permeabilised and stained with DAPI. Images were acquired using a 20× objective with the BZ-9000 fluorescence microscope (Keyence). Numbers indicate the fraction of GFP positive cells (%) normalized to that obtained in cells transfected with control siRNA.

Figure 3:
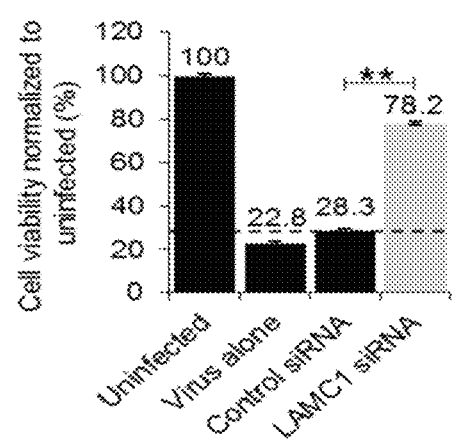

FIG. 3: Silencing of LAMC1 protects cells from H-1PV oncotoxicity.

HeLa cells were transfected with control or LAMC1 siRNAs. At 72 h post-transfection, cells were infected or not with H-1PV (MOI 0.25, pfu/cell) and grown for additional 72 h before the measurement of cell viability by the CellTitre-Glo 2.0 assay as described in Materials and Methods. The numbers on top of the columns represent the % of cell viability normalized to uninfected cells.

Figure 4:
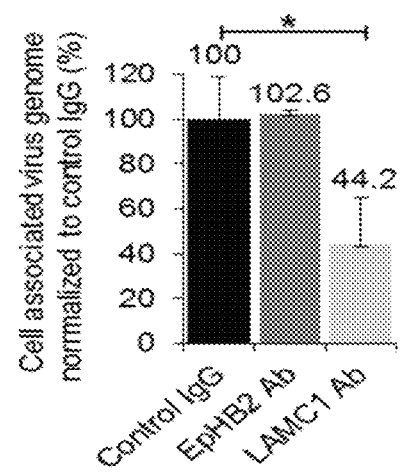

FIG. 4: LAMC1 antibody impairs H-1PV cell uptake.

HeLa cells were incubated with either IgG isotype (control), unrelated Ephrin type B receptor (EPHB2) or laminin-γ1 (LAMC1) antibodies for 45 min on ice. H-1PV cell membrane binding/entry assay was performed by treating the cells with H-1PV (MOI 0.25 pfu/cell) first for 30 min in ice and then for 60 min at 37° C. in a serum free medium. Cells were then processed as described in the legend of FIG. 2 A.

Figure 5:
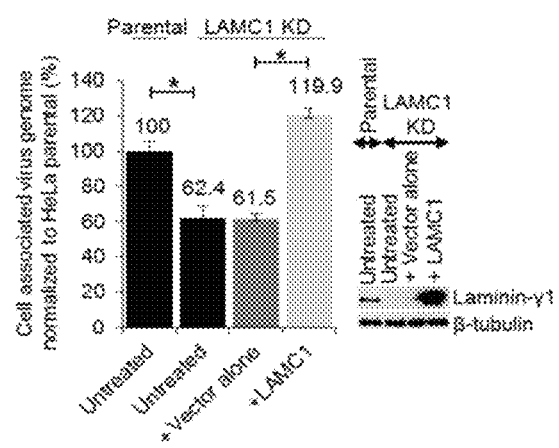

FIG. 5: CRISPR-Cas9 mediated knock down of LAMC1 impairs H-1PV uptake which is rescued by re-introduction of exogenous LAMC1.

Parental HeLa and LAMC1 KD (a LAMC1-knockdown HeLa cell line constructed using the CRISPR™ Cas9 technology) were transfected or not with either an empty vector (+vector alone) or vector expressing LAMC1 (+LAMC1). At 48 h post-transfection, cells were infected with H-1PV (MOI 100 pfu/cell) for 4 h at 37° C. for the virus uptake assay. Cells were then processed as described in the legend of FIG. 2 A.

Figure 6A:
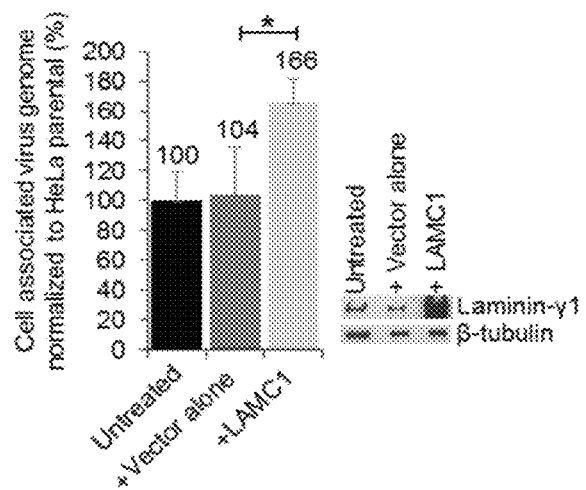
Figure 6B:
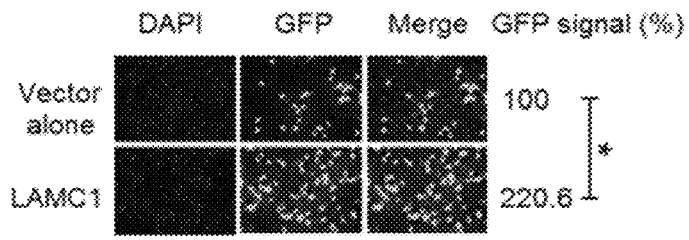
Figure 7A:
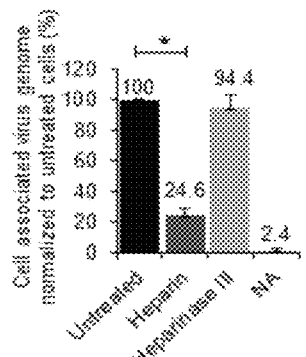
Figure 7B:
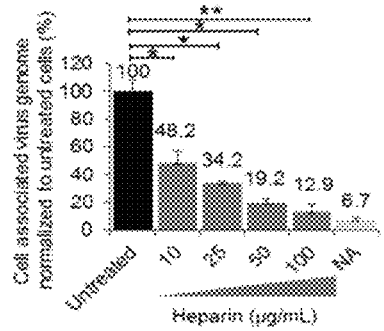
Figure 7C:
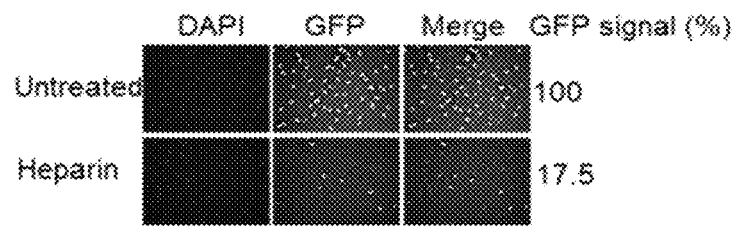
Figures 7D, 7E:
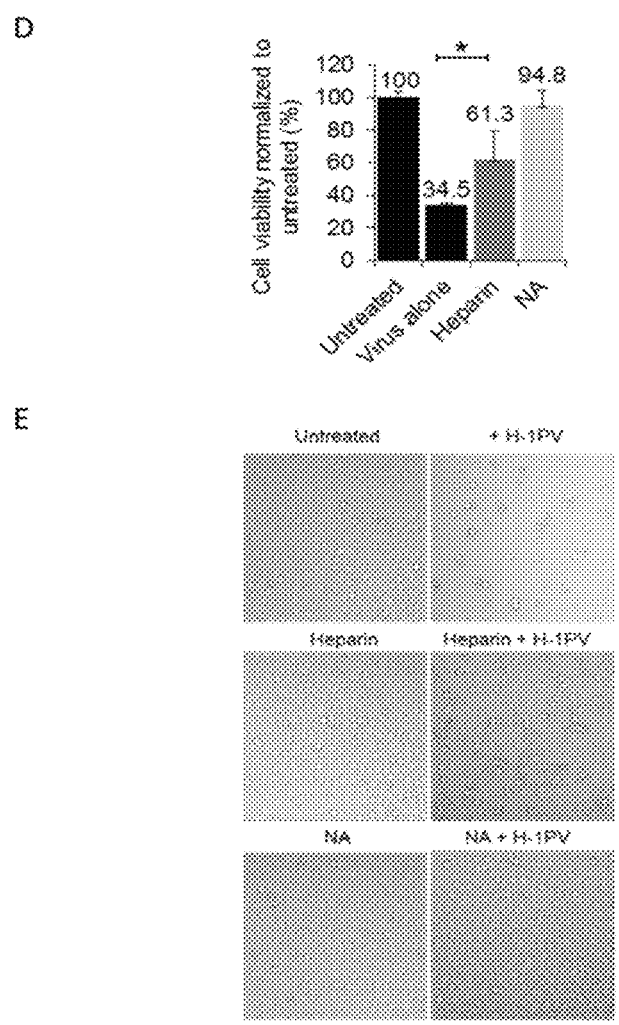

FIG. 6A-6B: Overexpression of LAMC1 enhances H-1PV cell uptake.

A, HeLa cells were transfected either with empty vector (+vector alone) or vector carrying LAMC1. Cells were then processed as described in FIG. 2 A. B, Overexpression of LAMC1 in HeLa enhances H-1PV transduction. HeLa cells were transfected with either vector alone or vector expressing LAMC1. At 46 h post-transfection cells were infected with recH-1PV-EGFP (0.25 TU, GFP/cell) and grown for additional 24 h and processed as described in the legend of FIG. 2 B. Statistical significance was calculated by the unpaired two tailed student t-test with *<p-0.05; <p-0.01; *<p-0.001

FIG. 7A-7E: Treatment with heparin reduces H-1PV cellular uptake.

A, Treatment with heparin but not removal of cell surface heparan sulphate by heparinase III impairs H-1PV uptake. HeLa cells were pretreated with heparinase III (0.1 U/ml) or heparin (50 µg/ml) for 18 h before being infected with H-1PV (MOI 1, pfu/cell) for 4 h at 37° C. Cells were then processed as described in FIG. 2 A.

B, Heparin impairs H-1PV uptake in a concentration dependent manner. HeLa cells were pre-incubated with increasing amounts of heparin (µg/ml) for 24 h and then infected with H-1PV (MOI 1, pfu/cell) for 4 h at 37° C. Neuraminidase (NA) [0.1 U/ml] was used as a positive control for blocking virus cell binding/entry. At the end of incubation, cells were treated as described in FIG. 2 A. The results are presented as cell associated viral genome (%) relative to HeLa untreated cells.

C, Treatment with heparin impairs H-1 PV transduction. HeLa cells were pre-incubated with heparin (100 µg/ml) for 18 h and then infected with recH-1PV-EGFP (TU 0.5, GFP/cell) for additional 24 h. Cells were then processed as described in FIG. 2 B.

D, Treatment with heparin protects cells from H-1PV oncotoxicity. HeLa cells were pretreated with heparin (100 µg/ml) or NA (0.1 U/ml) for 18 h and then infected with H-1PV (MOI 1, pfu/cell) for 96 h. Cell viability was assessed by the CellTitre-Glo 2.0 assay. Results are presented as cell viability % normalized to untreated cells. Representative phase contrast microscopic images of untreated or treated cells are also shown (E).

FIG. 8: Treatment with soluble laminins containing the γ1 chain impairs H-1PV transduction.

HeLa cells were pre-incubated with 2 µg/ml of indicated laminins or fibronectin for 24 h and then infected with recH-1PV-EGFP (TU 0.5, GFP/cell) for additional 27 h. Neuraminidase (NA) [0.1 U/ml] was used as a positive control for blocking virus infection. Cells were then processed as described in the legend of FIG. 2 B.

Figures 9A, 9B:
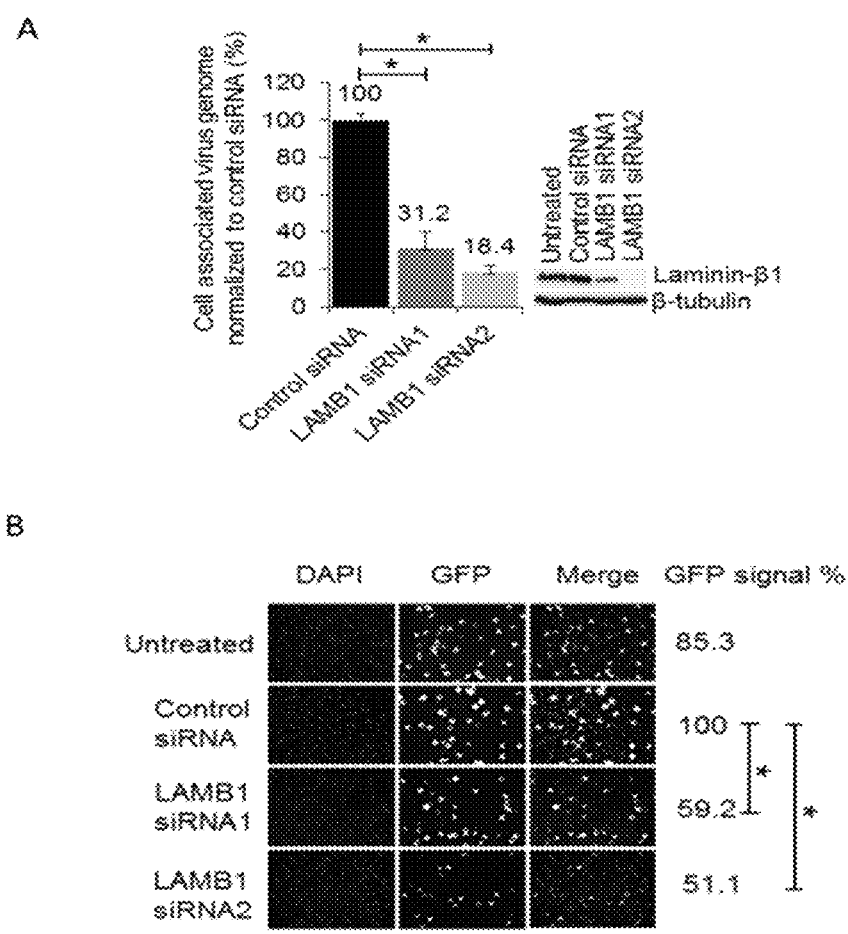

FIG. 9A-9B: LAMB1 plays a role in H-1PV cellular entry.

A, Silencing of LAMB1 decreases H-1PV infectivity. HeLa cells were transfected with control siRNA or two LAMB1 siRNAs targeting different regions of the gene. At 46 h post-transfection, cells were infected with H-1PV (MOI 1, pfu/cell). Cell binding/entry assay was performed for 4 h at 37° C. and then cells were processed as described in FIG. 2 A. Western blot analysis confirmed the siRNA mediated down-regulation of LAMB1. β-tubulin was used as a loading control.

B, Down-regulation of LAMB1 by siRNAs decreases H-1PV transduction. HeLa cells were transfected with control siRNA or the LAMB1 siRNAs. At 46 h post-transfection, cells were infected with recH-1PV-EGFP (TU 0.5 GFP/cell) for 24 h. Cells were then processed as described in FIG. 2 B.

Figures 10A, 10B:
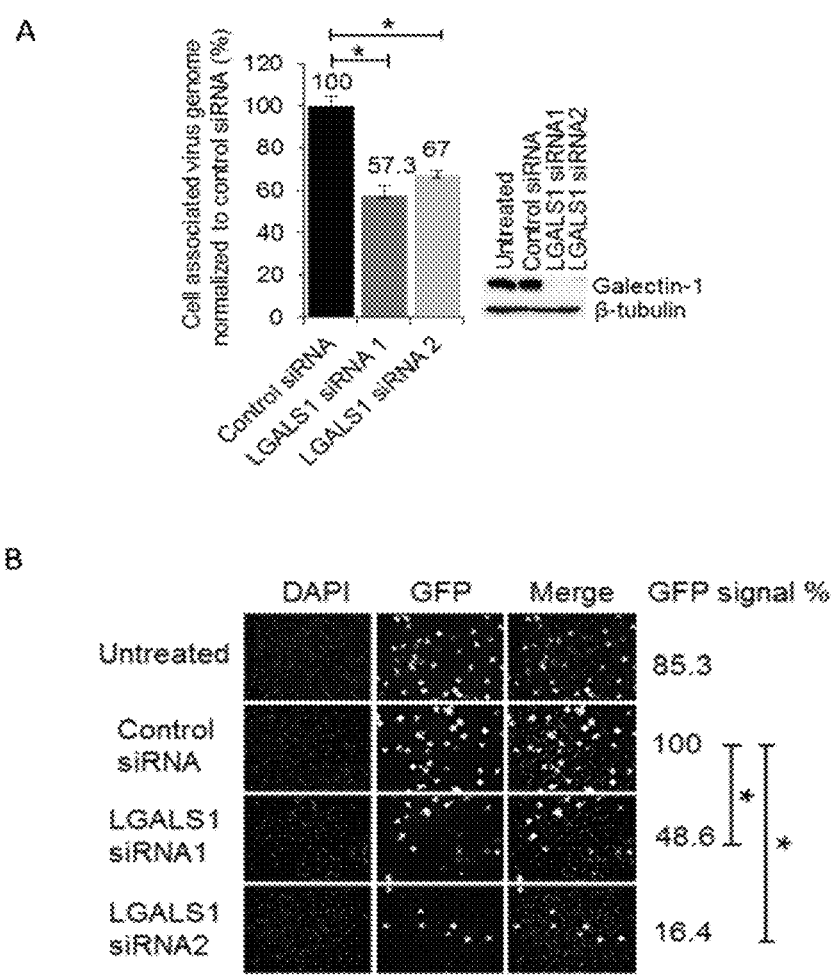

FIG. 10A-10B: Galectin-1 is also involved in H-1PV entry.

A, Silencing of LGALS1 decreases H-1PV cell uptake. The experiments were performed as described in FIG. 2 A using two siRNAs targeting two distinct regions of LGALS1. Western blot analysis was performed to control LGALS1 silencing efficiency.

B, siRNAs mediated down-regulation of LGALS1 decreases H-1PV transduction. The experiment was carried out as described in FIG. 2 B.

Figure 11:
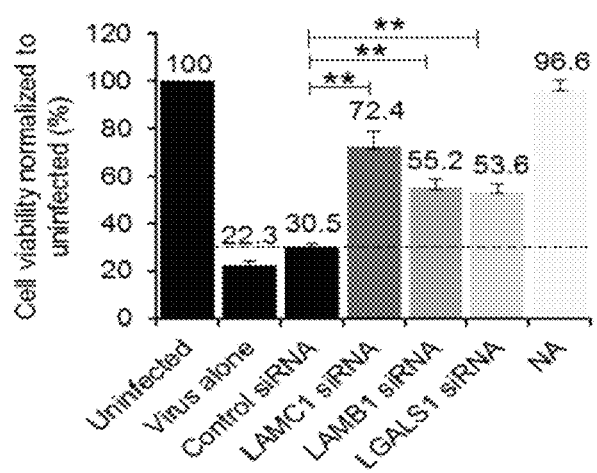

FIG. 11: Downregulation of LAMC1, LAMB1 and LGALS1 protects cells from H-1PV oncotoxicity.

HeLa cells were transfected with control siRNA, or siRNAs targeting LAMC1, LAMB1 or LGALS1. At 72 hours post-transfection, cells were infected with H-1PV (MOI 0.25 pfu/cell). Neuraminidase (NA) at the concentration of 0.1 U/ml was used as a control to block virus cell membrane binding/entry. Cell viability was assessed by the CellTitre-Glo 2.0 assay, 72 h post-infection. The results are presented as percentage of cell viability (%) relative to uninfected cells. Numbers on top of the columns show average cell viability values from six biological replicates with relative standard deviation bars. Statistical significance was calculated by unpaired two tailed student t-test with $*<p-0.05$; $<p-0.01$; $*<p-0.001$.

FIG. 12A-12B: LAMC1, LAMB1 and LGALS1 are involved in H-1PV virus cell membrane binding/entry.

HCT116 (A) and A549 (B) cancer cell lines were used for confirming the results obtained in HeLa cells showing that LAMC1, LAMB1 and LGALS1 are involved in H-1PV cellular uptake. Cells were transfected with indicated siRNAs and treated as described in FIG. 2 A. The results are presented as cell associated virus genome (%) normalized to control siRNA. Western blot analyses-controlled siRNA mediated down-regulation of the three genes at the protein level using β-tubulin as a loading control.

FIG. 13A-13E: NCI-60 cancer cell lines screening reveals LAMC1 and LGALS1 as key determinants of H-1PV oncotoxicity.

A, Cell proliferation analysis. 53 cancer cell lines belonging to the NCI 60 panel were tested for sensitivity to H-1PV infection by using the xCELLigence Real-Time Cell Analyser (ACEA Biosciences, Inc). Cancer cell lines were left untreated or infected with indicated H-1PV multiplicity of infection (MOI, plaque forming unit(pfu)/cell). Cell growth was monitored in real time for a total of 168 hours and expressed as normalized cell index (CI). Kinetic response profiles of one H-1PV sensitive (SNB-75) and one H-1PV resistant (COLO205) cancer cell line are shown as representative examples.

B, Calculation of EC50 values. The CI values obtained with the xCELLigence analysis were used to calculate the EC50 values (viral MOI which kills the 50% of the cell population) at four-time points after infection (24, 48, 72 and 96 hours, see also Suppl. FIG. 2). Based on the EC50 value corresponding to the 72 hours, cancer cell lines were classified into the six indicated groups.

C, Comparative gene expression analysis. The EC50 values (72 hours) were used as an input for DTP-COMPARE analysis [dtp.cancer.gov/databases_tools/compare.htm] which compared the gene expression profiles of H-1PV sensitive versus non-sensitive [resistant to MOI (pfu/cell) 50] cancer cell lines using available gene expression profile datasets. Putative H-1PV repressors (genes up-regulated in H-1PV resistant and/or down-regulated in sensitive cancer cell lines) and activators (up-regulated in sensitive and/or down regulate in resistant cancer cell lines) were identified by this method.

D, Differential expression analysis. The gene expression data from panel of NCI-60 cancer cell lines was mined utilizing CellMiner bioinformatic tool [discover.nci.nih.gov/cellminer/]. The retrieved data were then harmonized, preprocessed, and transformed by merging gene expression data obtained by comparing 6 non-sensitive [resistant to MOI (pfu/cell) 50] versus 47 sensitive to H-1PV infection. The differential expression analysis based on Limma+B&H correction was then applied for the identification of candidate gene involved in H-1PV life cycle ($p<0.05$).

E, Venn diagram. The list of putative activators obtained from DTP-COMPARE and differential expression analyses were merged in order to identify common H-1PV activators.

Figure 14:
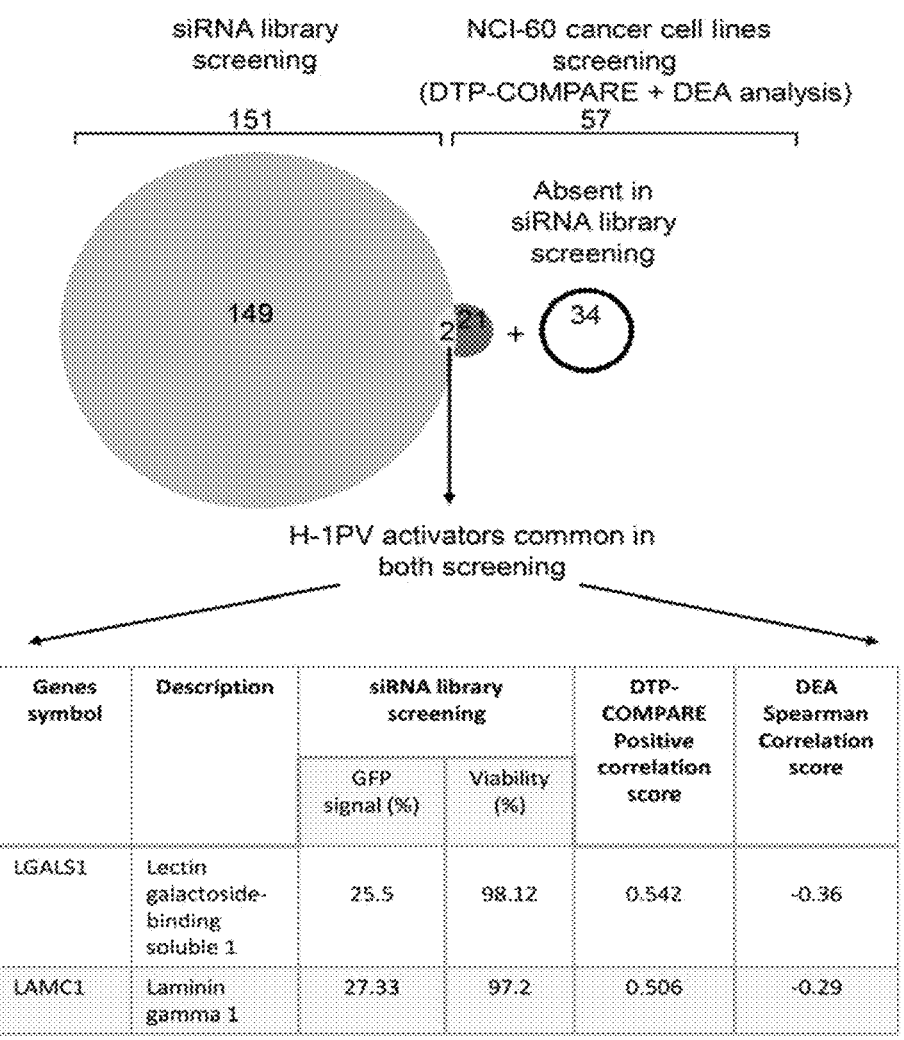

FIG. 14: Data sets integration to identify common activators of H-1PV life cycle.

a, Venn diagram. Integration of the two data sets obtained from the siRNA library (FIG. 1) and NCI-60 cancer cell lines (FIG. 13) screenings identified LAMC1 and LGALS1 as strong activators of H-1PV life cycle.

Figure 15:
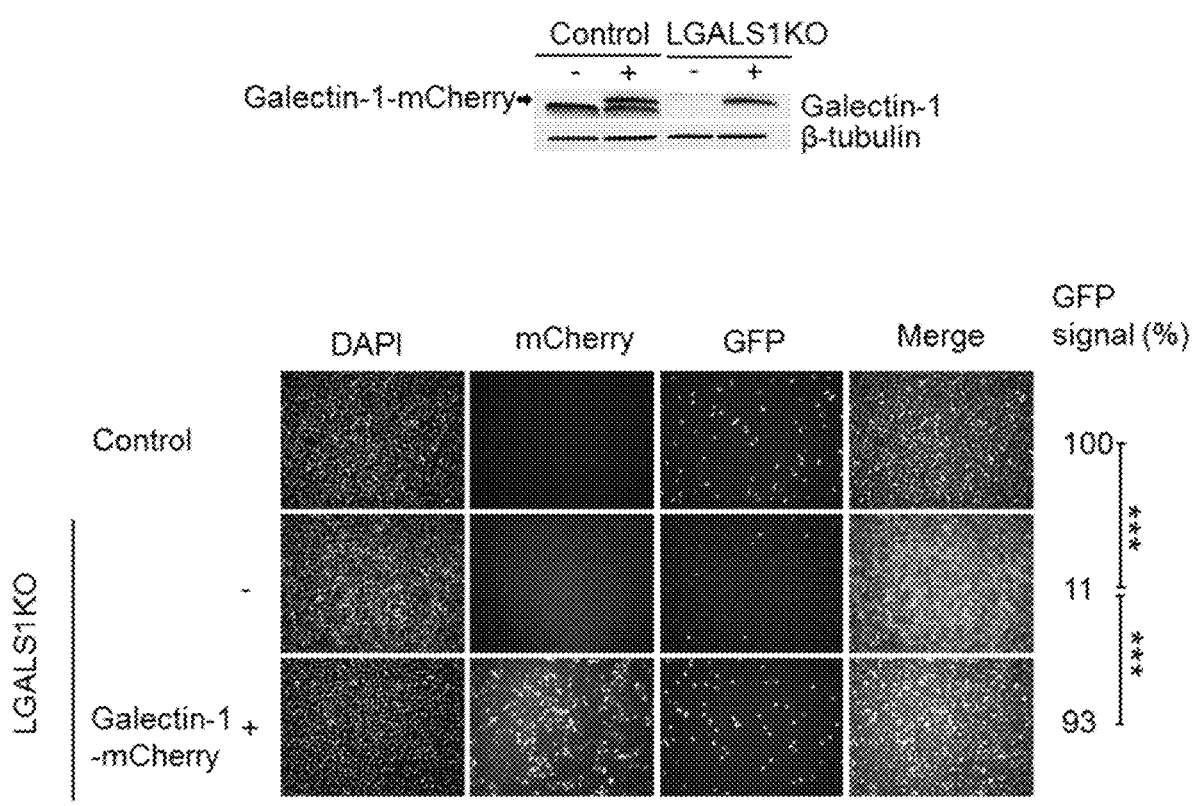

FIG. 15: CRISPR-Cas9 mediated knock out of LGALS1 impairs H-1PV transduction which is rescued by re-introduction of exogenous LGALS1. Western Blot analysis verified CRISPR-Cas9 mediated knock out of LGALS1 in NCH125-LGALS1KO cells. LGALS1 expression was re-established in these cells after transient transfection of a plasmid encoding galectin-1 (pLGALS1-mCherry). β-tubulin was used as a loading control. NCH125-LGALS1KO cells (LGALS1KO) were transfected or not with pLGALS1-mCherry. At 48 h post-transfection, cells were infected with recH-1PV-EGFP (0.3 TU, GFP/cell) and grown for additional 24 h. Numbers indicate the fraction of EGFP positive cells (%) normalized to that obtained in NCH125-Control. Statistical significance was calculated by the unpaired two tailed student t-test $*<p-0.05$, $p-0.01$, $*p-0.001$.

Figure 16A:
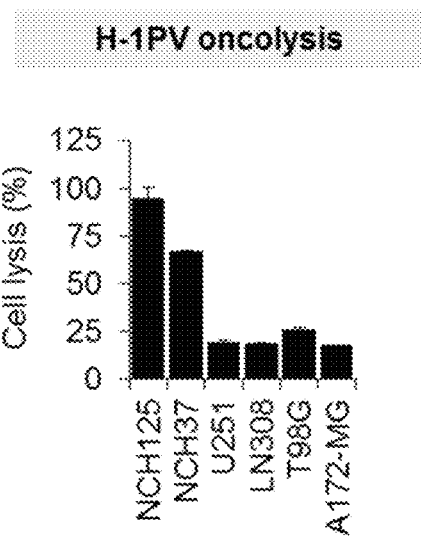
Figure 16B:
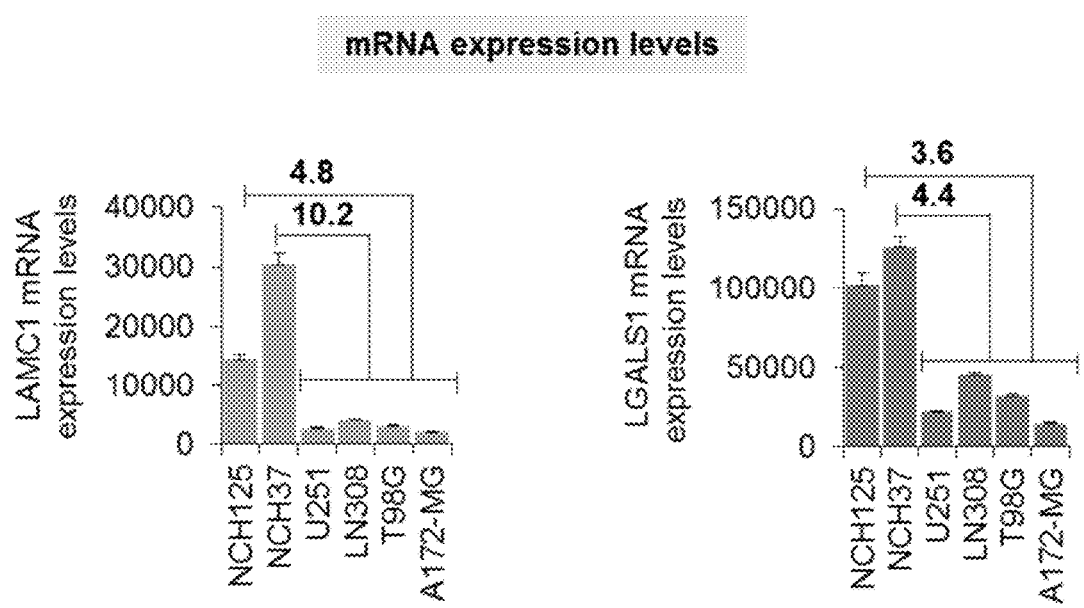

FIG. 16A-16B: LAMC1 and LGALS1 mRNA expression levels correlate with H-1PV efficacy of inducing cell lysis in glioblastoma cell lines.

A, The indicated glioma derived cell lines, were infected with H-1PV (MOI 10, pfu/cell) for 72 h before being processed for LDH assay in order to measure H-1PV induced cell lysis.

B, After isolation of total RNA, LAMC1 and LGALS1 mRNA expression levels were measured in the six glioblastoma cell lines by Nanostring analysis. Values were normalized using ATCB1, RPL19 and GAPDH as house keeping genes. Numbers on the top of the columns indicate gene expression fold changes between H-1PV highly sensitive (NCH125 or NCH37) vs poorly susceptible (U251, LN308, T98G, and A172-MG) cancer cell lines.

Figure 17:
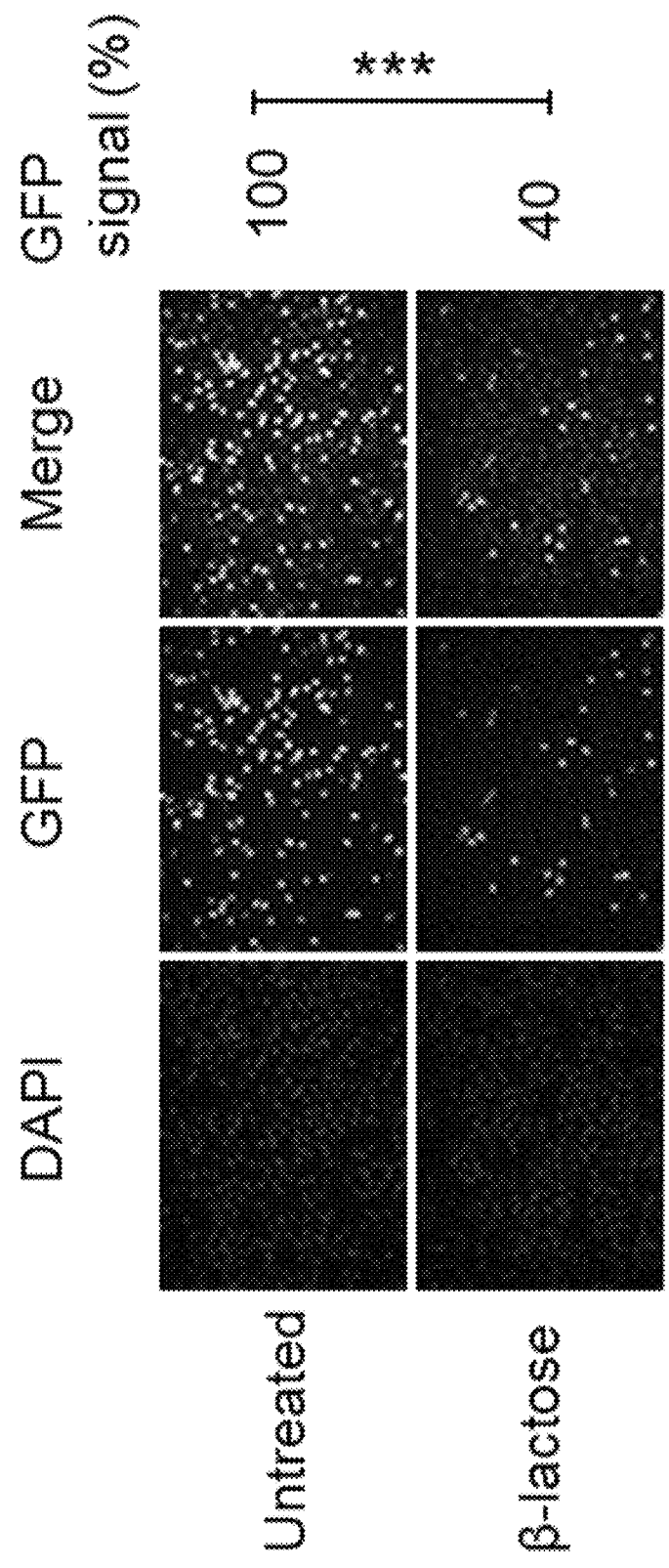

FIG. 17: Pre-Treatment with β-lactose decreases H-1PV transduction.

HeLa cells were pre-incubated with 200 mM of β-lactose for 30 minutes and then infected with recH-1PV-EGFP (TU 0.3, GFP/cell) for additional 24 h. Cells were then processed as described in the legend of FIG. 2B. Statistical significance was calculated by the unpaired two tailed student t-test $*<p-0.05$, $p-0.01$, $*p-0.001$.

DETAILED DESCRIPTION OF THE PRESENT INVENTION

This object has been solved by the subject-matter of the independent claims. Preferred embodiments are the subject-matter of the dependent claims.

In one aspect, the present invention provides a method of determining whether a patient suspected to suffer from cancer is a candidate for H-1PV therapy for the said cancer comprising the step of subjecting a patient's biological sample to at least one assay to measure the presence and/or level of a biomarker selected from a laminin and/or galectin, wherein when in the biological sample the biomarker is present, the patient is identified as a candidate for cancer therapy with H-1PV. It is important to verify that these factors (a laminin and/or a galectin) are expressed in the tumours because their absence may indicate tumours poorly susceptible to H-1PV treatment. In the absence of the factors the virus may remain outside of the cancer cell.

The inventors show that members of the laminin and galectin families play a central role in the early steps of H-1PV life cycle at the level of virus-cell surface recognition and entry. Furthermore, by using 53 different cancer cell lines with different sensitivity to H-1PV infectivity, the inventors found a statistically significant positive correlation between the expression levels of laminins and/or galactins, in particular LAMB1, LAMC1 and LGALS1, encoding for laminin-β chain, laminin-γ chain and galectin-1 respectively, and H-1PV oncolytic activity. These results provide clear evidence that the laminins and galectins may serve as prognostic or predictive markers to determine the outcome of H-1PV infection.

As mentioned above, the rat protoparvovirus H-1PV is an oncolytic virus currently being evaluated in clinical studies. First phase I/II clinical trial in patients suffering from recurrent glioblastoma showed that the H-1PV treatment is safe, well tolerated and associated with tumour microenvironment immune-conversion and surrogate evidence of efficacy. A mechanistic understanding of the H-1PV life cycle with identification of the cellular determinants needed for virus infectivity and oncolysis is absolutely necessary for a more efficient application of the virus in a clinical setting. This improved knowledge may not only guide the rational design of combination strategies and help the engineering of more potent and effective viruses but also contribute to the identification of biomarkers needed for the selection of those patients who most likely will respond to the treatment. In this invention, by using a number of different approaches (e.g. siRNA library screening, gain and loss of function experiments, competition experiments etc.) the inventors show that members of the laminin and galectin families are involved in H-1PV cell surface recognition and entry. The discovery that laminins and galectins play an important role in dictating H-1PV infection has important implications for H-1PV clinical use. For instance, the inventors found that heparin, which is used in clinical practice as an anticoagulant, and is known to bind to laminins, may block H-1PV entry thereby decreasing virus cell infection and oncolysis. Thus, the simultaneous and/or concomitant use of heparin together with the virus treatment should be carefully considered. Furthermore, the identified genes have been implicated in carcinogenesis and are markers of poor prognosis for several tumour types including brain lower grade glioma. The inventors envisioned that these genes would serve as biomarkers to predict the clinical response of H-1PV treatment as the expression patterns of these genes may be one of the determinants of viral oncotropism. The inventors provide important evidence for that by showing a direct correlation between the expression levels of laminins and galectins and the ability of H-1PV to induce oncolysis in 53 cancer cell lines having different susceptibility to H-1PV infection.

Cancer cell lines derived from lung, CNS, breast cancers, pancreas and melanoma expressing high levels of laminins and galectins were among the most sensitive to H-1PV infection. On the contrary, cell lines derived from colon and ovarian cancers with low levels of laminins and galectins were among the most resistant to H-1PV infection.

Using data from "The Cancer Genome Atlas" (TGCA, cancergenome.nih.gov) the inventors observed for certain tumors an inversely proportional correlation between LAMC1 and LGALS1 expression levels and patient survival: the highest are the LAMC1 and LGALS1 expression levels the poorest is the survival. Thus, LAMC1 overexpression may be considered as a marker of poor prognosis in kidney renal papillary cell carcinoma (KIRP), brain lower grade glioma (LGG), stomach adenocarcinoma (STAD), bladder urothelial carcinoma (BLCA), cervical squamous cell carcinoma and endocervical adenocarcinoma (CESC), rectum adenocarcinoma (READ) and lung adenocarcinoma (LUAD). On the other hand, LGALS1 overexpression is associated with poor prognosis in LGG, kidney renal clear cell carcinoma (KIRC), acute myeloid leukemia (LAML) and BLCA (P-value<0.05) (FIG. 1C). Due to the LAMC1 overexpression and/or LGALS1 overexpression the above mentioned tumours with otherwise poor prognosis are ideal candidates for H-1PV infection and the poor prognosis could be reversed into a better prognosis due to their susceptibility to H-1PV infection. The reversal from a poor prognosis to a better or even good prognosis means that the patient's overall survival and/or progression-free survival may be improved or enhanced by H-1PV based treatments. As shown below in more detail, cancer cell lines derived from lung, CNS, breast cancers and melanoma were among the most sensitive to H-1PV infection. In addition, in agreement with previous results, a positive correlation between the LAMC1 and LGALS1 mRNA levels and H-1PV oncolysis was also found in glioblastoma cell lines, being the cell lines expressing higher levels of the two genes more sensitive to H-1PV infection.

Since H-1PV is particularly suitable in combination cancer therapies, the present invention will also contribute to increase the treatment efficacy of those combination therapies. In this regard reference is made to several patents and patent applications where combination cancer therapies using H-1 PV have been described, for example EP 2 082 745 B1, EP 2 431 045 B1, EP 2 227 240 B1, WO 2010/139401 A1, WO 2011/113600 A1, EP 3 024 491 B1, WO 2016/128146 A1, WO 2017/167626 A1.

The term "laminin" means a high-molecular weight (~400 to ~900 kDa) protein of the extracellular matrix. Laminins are a major component of the basal lamina (one of the layers of the basement membranes), a protein network foundation for most cells and organs. The laminins are an important and biologically active part of the basal lamina, influencing cell differentiation, migration, and adhesion. Laminins are heterotrimeric proteins that contain an α-chain, a β-chain, and a γ-chain, found in five, four, and three genetic variants, respectively. The laminin molecules are named according to their chain composition. Thus, laminin-511 contains α5, β1, and γ1 chains. Fifteen other chain combinations have been identified in tissues. The trimeric proteins intersect to form a cross-like structure that can bind to other cell membrane and extracellular matrix molecules. The three shorter arms are particularly good at binding to other laminin molecules, which allows them to form sheets. The long arm is capable of binding to cells, which helps anchor organized tissue cells to the membrane. The laminin family of glycoproteins are an integral part of the structural scaffolding in almost every tissue of an organism. They are secreted and incorporated into cell-associated extracellular matrices. Laminin is vital for the maintenance and survival of tissues. For instance LN111 is usually found in normal colorectal and breast tissues. LN alpha chains 2, 3, 6, are more abundant in human gastric mucosa. Other laminin chains have different pattern of expression. Aberrant expression of laminins can also be found in carcinomas[19]. Defective laminins can cause muscles to form improperly, leading to a form of muscular dystrophy, lethal skin blistering disease (junctional epidermolysis bullosa) and defects of the kidney filter (nephrotic syndrome). Sixteen laminin trimers have been identified. The laminins are combinations of different alpha-, beta-, and gamma-chains.

The five forms of alpha-chains are: LAMA1, LAMA2, LAMA3 (which has three splice forms), LAMA4, LAMA5

The beta-chains include: LAMB1, LAMB2, LAMB3, LAMB4

The gamma-chains are: LAMC1, LAMC2, LAMC3

The term "galectin" means a class of proteins that bind specifically to β-galactoside sugars, such as N-acetyllactosamine (Galβ-3GlcNAc or Galβ1-4GlcNAc), which can be bound to proteins by either N-linked or O-linked glycosylaton. They are also termed S-type lectins due to their dependency on disulfide bonds for stability and carbohydrate binding. There have been 15 galectins discovered in mammals, encoded by the LGALS genes, which are numbered in a consecutive manner. Only galectin-1, -2, -3, -4, -7, -8, -9, -10 and -12 have been identified in humans. Galectin-5 and -6 are found in rodents, whereas galectin-11, -14 and -15 are uniquely found in sheep and goats. Unlike the majority of lectins they are not membrane bound, but soluble proteins with both intra- and extracellular functions. They have distinct but overlapping distributions but found primarily in the cytosol, nucleus, extracellular matrix or in circulation. The role of galectins in cancer has been summarized in a review article by Ebrahim et al.[27]. Galectins constitute a family of lectins containing a conserved carbohydrate recognition domain with ability to interact with β-galactosides, such as lactose. For instance, it was found that β-lactose binds to galectin-1 inducing conformational changes which affect the functionality of the protein[28]. The inventors have shown in the present invention that β-lactose by interacting with galectin-1 decreases H-1PV infection/transduction.

The terms "therapy", "therapeutic", "treatment" and "treating" are used herein to characterize a therapeutic method or process that is aimed at (1) slowing down or arresting the progression, aggravation, or deterioration of the symptoms of the disease state or condition to which such term applies; (2) alleviating or bringing about ameliorations of the symptoms of the disease state or condition to which such term applies; and/or (3) reversing or curing the disease state or condition to which such term applies.

The term "overall survival (OS)" refers to the length of time during and after treatment the patient survives. As the skilled person will appreciate, a patient's overall survival is improved or enhanced, if the patient belongs to a subgroup of patients that has a statistically significant longer mean survival time as compared to another subgroup of patients.

The term "progression-free survival (PFS)" refers to the length of time during and after treatment during which, according to the assessment of the treating physician or investigator, the patient's disease does not become worse, i.e., does not progress. As the skilled person will appreciate, a patient's progression-free survival is improved or enhanced if the patient belongs to a subgroup of patients that has a longer length of time during which the disease does not progress as compared to the average or mean progression free survival time of a control group of similarly situated patients.

The term "reference level" herein refers to a predetermined value. As the skilled artisan will appreciate the reference level is predetermined and set to meet the requirements in terms of e.g. specificity and/or sensitivity. These requirements can vary, e.g. from regulatory body to regulatory body. It may for example be that assay sensitivity or specificity, respectively, has to be set to certain limits, e.g. 80%, 90% or 95%. These requirements may also be defined in terms of positive or negative predictive values. Nonetheless, based on the teaching given in the present invention it will always be possible to arrive at the reference level meeting those requirements. In one embodiment the reference level is determined in healthy individuals. The reference value in one embodiment has been predetermined in the disease entity to which the patient belongs. In certain embodiments the reference level can e.g. be set to any percentage between 25% and 75% of the overall distribution of the values in a disease entity investigated. In other embodiments the reference level can e.g. be set to the median, tertiles or quartiles as determined from the overall distribution of the values in a disease entity investigated. In one embodiment the reference level is set to the median value as determined from the overall distribution of the values in a disease entity investigated.

The term "prognosis" refers to a forecast as to the probable outcome of the disease as well as the prospect of recovery from the disease as indicated by the nature and symptoms of the case. Accordingly, a negative or poor prognosis is defined by a lower post-treatment survival term or survival rate. Conversely, a positive or good prognosis is defined by an elevated post-treatment survival term or survival rate. Usually prognosis is provided as the time of progression free survival or overall survival.

The term "monitoring a therapy" means for the purpose of the present invention to observe disease progression in a subject who receives a cancer therapy. In other words, the subject during the therapy is regularly monitored for the effect of the applied therapy, which allows the medical practitioner to estimate at an early stage during the therapy whether the prescribed treatment is effective or not, and therefore to adjust the treatment regime accordingly.

As used herein, the term "subject" or "patient" refers to any animal (e.g., a mammal), including, but not limited to, humans, non-human primates, rodents, and the like, which is to be the recipient of a particular treatment. Typically, the terms "subject" and "patient" are used interchangeably herein in reference to a human subject. As used herein, the term "subject suspected of having cancer" refers to a subject that presents one or more symptoms indicative of a cancer (e.g., a noticeable lump or mass). A "subject (suspected of) having cancer" encompasses an individual who has received an initial diagnosis (e.g., a CT scan showing a mass) but for whom the sub-type or stage of cancer is not known. The term further includes people who once had cancer (e.g., an individual in remission), and people who have cancer and are suspected to have a metastatic spread of the primary tumor.

The term "cancer" and "cancer cells" refers to any cells that exhibit uncontrolled growth in a tissue or organ of a multicellular organism. Particular preferred cancers in context of the present invention are colorectal cancer, pancreatic cancer, gastric cancer, skin cancer, breast cancer, lung cancer, prostate cancer, hepatocellular cancer, cervical cancer, ovarian cancer, liver cancer, bladder cancer, kidney cancer, cancer of the urinary tract, thyroid cancer, renal cancer, melanoma, leukemia, head and neck cancer, multiple myeloma or brain cancer. In preferred embodiments the brain cancer is glioblastoma; the lung cancer is non-small cell lung carcinoma; the pancreatic cancer is pancreatic ductal adenocarcinoma, the breast cancer is invasive ductal carcinoma, the skin cancer is melanoma and the colon cancer is colon adenocarcinoma.

The term "biological sample" as used herein refers to a sample that was obtained and may be assayed for any one of the laminins and/or galectins as disclosed with the present invention, or their gene expression. The biological sample can include a biological fluid (e.g., blood, cerebrospinal fluid, urine, plasma, serum), tissue biopsy, and the like. In some embodiments, the sample is a tissue sample, for example, tumor tissue, and may be fresh, frozen, or archival paraffin embedded tissue. Certain biological fluids derive from particular tissues, organs or localized regions and certain other biological fluids may be more globally or systemically situated in a subject or biological source. Examples of biological fluids include blood, serum, plasma, lymph, urine, cerebrospinal fluid, saliva, mucosal secretions of the secretory tissues and organs, vaginal secretions, ascites fluids such as those associated with non-solid tumors, fluids of the pleural, pericardial, peritoneal, abdominal and other body cavities, and the like. Biological fluids may also include liquid solutions contacted with a subject or biological source, for example, cell and organ culture medium including cell or organ conditioned medium, lavage fluids and the like. In certain highly preferred embodiments the biological sample is serum, and in certain other highly preferred embodiments the biological sample is a biopsy.

The invention further relates to a kit for predicting whether a patient suspected to suffer from cancer is a candidate for H-1PV therapy, which kit comprises:
 (a) means for measuring the level of a biomarker selected from the group consisting of laminins and/or galectins; and
 b) optionally, a label giving instructions for the use of said kit in predicting whether a patient suspected to suffer from cancer is a candidate for H-1PV therapy.

The above methods and use of the invention may be, for instance, in vitro or ex vivo methods and use.

Means for measuring the expression level of laminin and/or galectin proteins are well-known in the art and include immunoassay such as ELISA assay. The methods involve antibodies which bind to laminin or galectin protein, for example a monoclonal or polyclonal antibody, an antibody variant or fragments such as a single chain antibody, a diabody, a minibody, a single chain Fv fragment (sc(Fv)), a Sc(Fv)2 antibody, a Fab fragment or a F(ab')2 fragment, or a single domain antibody. Such antibodies are well known in the art and are commercially available, e.g. mouse monoclonal anti-Laminin γ-1, mouse monoclonal anti-Laminin β-1 or rabbit polyclonal anti-Galectin-1. They may also notably be obtained by immunization of animals (for example rabbits, rats or mice) with laminin or galectin protein. Antibodies may be used to determine protein expression in a range of immunological assays including competitive and non-competitive assay systems using techniques such as western blotting, immunohistochemistry/immunofluorescence (i.e protein detection on fixed cells or tissues), radioimmunoassay such as RIA (radio-linked immunoassay), ELISA (enzyme linked immunosorbent assay), "sandwich" immunoassays, immunoprecipitation assays, immunodiffusion assays, agglutination assays, complement-fixation assays, immunoradiometric assays, fluorescent immunoassays, e.g. FIA (fluorescence-linked immunoassay), chemiluminescence immunoassays, ECLIA (electrochemiluminescence immunoassay) and protein A immunoassays. Such assays are routine and well known to the person skilled in the art (Ausubel et al (1994) *Current Protocols in Molecular Biology*, Vol. 1, John Wiley & Sons, Inc., New York).

Protein expression of laminins or galectins may be determined by proteomic method such as mass spectrometry assays (LC-MS or LC-MS/MS). Qualitative and quantitative mass spectrometric techniques are known and used in the art. To this aim, target peptides specific for marker proteins are selected and quantified based on calibration curves established with synthetic peptides labeled with stable isotopes. Enzymatic digests, spiked with a defined amount of isotope labeled target peptides, are analyzed by liquid chromatography coupled with mass spectrometry. The ratio between labeled and non-labeled target peptides is measured to assess target peptide concentrations and therefore protein marker concentration.

The means for measuring the expression level of laminins or galectins may also include reagents such as e.g. reaction and/or washing buffers. The means may be present, e.g., in vials or microtiter plates, or be attached to a solid support such as a microarray as can be the case for primers and probes.

Other methods for measuring the gene expression levels of laminins and galectins may also be based on nucleic acid analysis namely mRNA levels, including, but not limited, RT-PCR, digital PCR, nanostring technology, microarray, FISH and Northern Blot.

Although the present invention and its advantages have been described in detail, it should be understood that various changes, substitutions and alterations can be made herein without departing from the spirit and scope of the invention as defined in the appended claims.

The present invention will be further illustrated in the following Examples which are given for illustration purposes only and are not intended to limit the invention in any way.

EXAMPLES

Example 1: Materials and Methods

Cell Lines

The cervical carcinoma derived HeLa cell line was a gift from Angel Alonso (German Cancer Research Center, Heidelberg, Germany). The transformed human embryonic kidney HEK293T cell line was obtained from the ATCC (LGS Standards GmBH, Wesel, Germany). The colon colorectal carcinoma derived HCT116, and the lung adenocarcinoma derived A549 cell lines were obtained by the National Cancer Institute (Rockville, Maryland US). HeLa, HEK293T and LAMC1-KD (the engineered HeLa cell line established in this study in which LAMC1 expression was down-regulated by CRISPR-Cas9 technology) were grown in Dulbecco's modified Eagle's medium supplemented with 10% fetal bovine serum (FBS; Gibco, Thermo Fisher Scientific, Darmstadt, Germany) and 2 mM L-glutamine (Gibco). For LAMC1-KD, 2 µg/ml puromycin were added to the medium for clones selection, expansion and maintenance. The HCT116 and A549 cancer lines were grown in RPMI medium with the addition of 10% FBS and 2 mM L-glutamine. The 53 cancer lines belonging to NCI 60 panel used in this study were all grown in RPMI medium with the addition of 10% FBS and 2 mM L-glutamine. All cell lines were grown at 37° C. in 5% $CO_2$ and 90% humidity. Cell lines, were verified for their identity by a human cell authentication test (Multiplexion GmbH, Mannheim, Germany) and frequently tested and confirmed to be free of mycoplasma contamination using VenorGEM OneStep Mycoplasma contamination kit (Minerva biolabs, Berlin, Germany).

High-Content siRNA-Based Screening of H-1PV Transduction

The human druggable genome siRNA Set 4.0 library comprising siRNA pools (4 siRNAs/pool) targeting 6,961 cellular genes was purchased from Qiagen (Hilden, Germany). The library was spotted and then reverse transfected in HeLa cells grown in Greiner μClear 96-well microplates using the INTERFERin reagent (Polyplus-transfection SA, Illkirch France). The high-throughput transfection protocol was optimized for reaching 90-95% transfection efficiency with minimal toxicity. The screening was performed in technical triplicates. Same cell passage (n=3 after thawing), serum and transfection agent batch were used for all plates to limit biological variability. The following internal controls siRNAs were used in each microplate to control inter-plate and day-to-day variability: (i) NS1-siRNA5: 5'GAATGGTTACCAATCTACC3', a siRNA targeting the NS1 coding region, used as a positive control as the NS1 protein is essential for virus transduction, (ii) scramble siRNA: 5'AATTCTCCGAACGTGTCACGT3' a non-targeting siRNA, used as a negative control (Qiagen) and (iii) polo-like kinase-1 gene (PLK1) siRNA: 5'CAAC-CAAAGTCGAATATGA3' targeting the PLK1 gene used as transfection efficiency control as the silencing of this gene leads to cell death. Two days post-transfection, cells were infected with recH-1PV-EGFP (a recombinant H-1PV expressing EGFP)[20] at MOI 0.35 pfu/cell and grown for further 24 hours. Plates were then fixed, stained with DAPI and subjected to fluorescence imaging to quantify H-1PV transduction efficiency by determining the percentage of GFP positive cell. A TECAN Freedom EVO liquid handling workstation was used for plate distribution of siRNAs, transfection reagent, cells and virus. High throughput cell imaging was carried out with the GE Healthcare Life Sciences INCELL1000 HCS epifluorescent microscope (Freiburg, Germany) analyzing on average 25,000 cells per microwell. The Multi Target Analysis software (GE Healthcare Life Sciences, Chicago, Illinois, US) was used to visualize cell nuclei (DAPI staining) and quantify the GFP co-localization to determine the percentage of transduced cells. We then applied our cellular segmentation protocol in order to determine GFP signal intensity per analyzed DAPI stained cell. Single cell data were analyzed with the RReportGenerator software and statistical significance determined[21].

Plasmid Constructions

The lentiCRISPRv1 plasmid[22] was purchased from Addgene (Cambridge, MA, US). The LAMC1 specific sgRNA GATGGACGAGTGCACGGACGA was designed using the online design tool (crispr.genome-engineering.org/) and then cloned into BsmBI digested lentiCRISPRv1 plasmid. A G nucleotide (in bold) was added to sgRNA for efficient recognition by U6 promoter. The resulting recombinant lentivirus expressing LAMC1-specific guide RNA was designated as lentiCRISPRv1-sgLAMC1. For gain of function experiments the pCAG-LAMC1-S/MAR expression vector was generated. The full length LAMC1 gene encoding for Laminin γ-1 cloned into pTriEX-1 (a generous gift of Winfried Stocker, EuroImmun, Luebeck, Germany) was used as template for the PCR. PCR-amplification was performed with the following primers: LAMC1.FOR 5'-AAGAATATCAAGATCATGAGAGGGAGC-CATCGGG-3' and LAMC1.REV 5'-CGCCGAGGCCA-GATCCTAGGGCTTTTCAATGGACGGG-3' with CloneAmp HiFi PCR Premix (Takara Bio, Mountain View, CA US). The PCR fragment was then cloned into BglII digested pCAG-S/MAR (kindly provided by Richard Harbottle, German Cancer Research Center, Heidelberg, Germany) using In-Fusion HD cloning kit (Takara Bio-Europe, Saint-Germain-en-Laye, France).

Virus Production

Wildtype H-1 parvovirus (H-1PV) was produced, purified and titrated as previously described[17]. Recombinant H-1PV (recH-1PV-EGFP) harboring the green fluorescent protein encoding gene was produced according to the protocol described in El-Andaloussi et al.[20]. Lentivirus expressing LAMC1-specific guide RNA (lentiCRISPRv1-sgLAMC1) was produced as previously described[22]. Briefly, 293T cells were transfected with plasmids lentiCRISPRv1-sgLAMC1, psPAX2 (Addgene, Cambridge, Massachusetts, USA), and pMD2.G (Addgene) at ratio (2:1.5:1) using the Lipofectamine LTX and Plus reagent (Life Technologies Europe by, Bleiswijk, Netherlands) according to the manufacturer's protocol. At 70 h post transfection, the cultural medium containing lentiviral particles was removed, centrifuged and cell debris discarded. The supernatant was filtered through a 0.45 μM filter (Millipore Steriflip HV/PVDF) (Merck Millipore, Burlington, MA, USA) concentrated 100× with PEG-it (BioCat Gmbh, Heidelberg, Germany), and re-suspended in DMEM cell culture medium containing 10% FBS, 2 mM L-glutamine and 1% BSA. Lentivirus aliquots were stored at −80° C. Lentivirus titration was carried out using Global UltraRapid Lentiviral Titer Kit (SBI System Biosciences, Palo Alto, CA, USA).

Generation of LAMC1-KD Cell Line

For the generation of LAMC1-KD cells, $5 \times 10^4$ HeLa cells were seeded in a 24-well plate and infected with $9.5 \times 10^6$ IFU (100 μl) of lentivirus particles harboring the lentiCRIS-PRv1-sgLAMC1 DNA. After 24 h, infection was repeated with same amount of lentivirus and cells grown for additional 24 h. DMEM cell culture medium supplemented with 10% FBS, 2 mM L-glutamine, 1% BSA and 2 μg/ml of puromycin was added for the selection of infected cells. Single-cell clones were expanded and confirmed for LAMC1 knock-out/down by Western Blot analysis.

Protein Extraction and Analysis

Cells were harvested from dishes by gently scraping with a rubber policeman directly in the culture medium. Cells were collected by centrifugation and washed with ice-cold PBS. After centrifugation, cell pellets were suspended in 5 volumes of lysis buffer (50 mM Tris, pH 8, 200 mM NaCl, 0.5% NP-40, 1 mM dithiothreitol [DTT]) containing protease inhibitors (complete EDTA free; Roche, Mannheim, Germany) and lysed on ice for 30 min. Cellular debris was removed by centrifugation (13,000 rpm for 15 min at 4° C.) and protein concentration in cell lysates was measured by bicinchoninic acid (BCA) assay (Thermo Fisher Scientific, Carlsbad, CA, USA), according to manufacturer's instructions. SDS-PAGE analysis was performed on 25 to 50 μg of total protein extract. After separation, proteins were transferred to Hybond-P membrane (GE Healthcare, Freiburg, Germany). Immunoblotting was carried out with the following antibodies: mouse monoclonal anti-β-tubulin (clone TUB 2.1; Sigma-Aldrich, Saint Louis, MO, USA) used at 1:2000 dilution, mouse monoclonal anti-Laminin γ-1 (clone B-4; Santa Cruz Biotechnology, Heidelberg, Germany) at 1:500 dilution, mouse monoclonal anti-Laminin β-1 (clone D-9; Santa Cruz Biotechnology, Heidelberg, Germany) at 1:500 dilution and rabbit polyclonal anti-Galectin-1 (Clone H-45; Santa Cruz Biotechnology, Heidelberg, Germany) at 1:500 dilution. After incubation with horseradish peroxidase conjugated secondary antibodies (Santa Cruz Biotechnology, Heidelberg, Germany), the membrane was incubated with Western Blot Chemiluminescence Reagent Plus (Perkin Elmer Life Sciences, Waltham, USA) and exposed to Hyperfilm™ ECL radiographic films (GE Healthcare, Buckinghamshire, UK).

Virus Cell Uptake Assays

Cells treated as described below were subjected to three snap freeze-thaw cycles to release cell associated viral particles. Viral DNA was purified both from an aliquot of the virus used as inoculum and from cell lysates using the QiAamp MinElute Virus Spin kit (Qiagen, Hilden, Germany) according to the manufacturer's instructions. Viral genome was quantified using a parvovirus-specific qPCR as previously described[17]. A minimum of two independent experiments each performed in triplicate were performed for every condition tested.

SiRNA Mediated Knock-Down Experiments

HeLa, HCT116, and A549 cell lines, were seeded at the density of $4\times10^4$ cells/well in a 24-well plate and grown in 500 µl of complete cellular medium without antibiotics. After 24 h, cells were transfected with siRNAs (5-10 nM) in a serum-free medium using Lipofectamine RNAimax (ThermoFisher Scientific, Carlsbad, CA, USA) according to the manufacturer's instructions. The following siRNAs were used: LAMC1_1 (SI00035742), LAMC1_5 (SI02757475), LAMB1_4 (SI00035707), LAMB1_9 (SI05109174), LGALS1_7 (SI03085453), LGALS1_8 (SI04998553), and AllStars Negative siRNA (SI03650318) used as negative control (all purchased from Qiagen, Hilden, Germany). After 24 h, the medium was changed and cells were further grown for an additional 24 h to allow efficient gene silencing. The culture medium was then removed and replaced with 0.2 ml serum-free medium containing H-1PV at a MOI 1 (pfu/cell). Infection was performed for 4 h at 37° C. to eventually allow cell surface binding and internalization of viral particles.

Drugs/Enzymes Pre-Infection Cell Treatment

Heparin (Cat. No. H4784), Neuraminidase (Cat. No. N2876), and Heparinase III (Cat. No. H8891) were all purchased from Sigma-Aldrich chemie GmbH (Steinheim, Germany). Heparin stock solution was freshly prepared and used on the same day. Neuramindase and heparinase III stock solution were prepared, aliquoted, and stored at −20° C. before use. $4\times10^4$ HeLa cells were seeded in 24 wells/plates and then pretreated with increasing amounts (10, 25, 50, 100 µg/ml) of heparin, or neuraminidase (0.1 U/ml) or heparinase III (0.1 U/ml) for 24 h. Before to be used for the infection, H-1PV (MOI 1, pfu/cell) was also pre-incubated with the same concentrations of heparin, neuraminidase or heparinase III, for 15 min at room temperature and then used for the infection. Cell binding/entry assay was performed for 4 h at 37° C.

Antibody Competition Assay

HeLa cells seeded at the density of $2\times10^4$ cells/well in a 24-well plate, were grown in 500 µl of complete cellular medium without antibiotics. After 24 h, cells were incubated for 45 min on ice with 10 µg/ml of mouse monoclonal control anti-IgG (isotype control) (Millipore, Temecula, CA, USA), mouse monoclonal anti-EPHB2 (Abnova, Taipei, Taiwan), or mouse monoclonal anti-Laminin γ-1 (clone B-4; Santa Cruz Biotechnology, Heidelberg, Germany) in DMEM medium supplemented with 10% FBS. At the end of incubation, the medium was removed and replaced with 0.1 ml serum-free medium containing H-1PV (MOI 0.25, pfu/cell). Virus binding assay was first performed for 30 min on ice. Cells were then washed twice with PBS to remove unbound virus particles and further incubated in fresh complete cellular medium for 1 h at 37° C. to allow internalization of virus particles.

Gain of Function Experiments

HeLa and LAMC1-KD cell lines, seeded in 24-well plates were transiently transfected either with plasmid alone or plasmid carrying the LAMC1 gene in serum-free medium by using Lipofectamine LTX (Thermo Fisher Scientific, Carlsbad, CA, USA) according to manufacturer's instructions. At 4 h post-transfection, the medium was replaced by complete cellular medium and cells were grown for additional 44 h. Virus cell uptake was carried out infecting the cells with H-1PV (MOI 100, pfu/cell) for 4 h at 37° C.

Cell Transduction Assay

SiRNA Mediated Gene Knock-Down Experiments $2\times10^4$ HeLa cells/well were seeded in a 24-well plate and grown in 500 µl of complete cellular medium without antibiotics. SiRNA transfection was performed as described above. At 46 h post-transfection, cells were infected with recH-1PV-EGFP (1 TU, GFP/cell) and grown for additional 24 h. Cells were then washed once with PBS, fixed in 3.7% formaldehyde for 5 min, permeabilized with 1% Triton X-100 for 10 min, and stained with DAPI for 2 min. Fluorescence images of EGFP positive-cells were acquired with a BZ-9000 fluorescence microscope (Keyence, Corporation, Osaka, Japan) with either ×10 or ×20 objective as described in figure legends. 4',6-diamidino-2-phenylindole (DAPI) staining was used to visualize the number of nuclei (cells). Percentage of GFP positive cells was calculated by counting at least 1500 cells. At least two independent experiments, each performed in duplicate, were performed for every condition tested.

Drug Treatment $4\times10^4$ HeLa cells were seeded in 24 wells/plates and then pre-incubated with heparin (100 µg/ml) for 18 h before to be infected with recH-1PV-EGFP (TU 0.5, GFP/cell). At 24 h post-infection, cells were processed as described above.

Treatment with Soluble Laminins or Fibronectin

Neuraminidase was purchased from Sigma-Aldrich chemie GmbH (Steinheim, Germany) and fibronectin from Merck KGaA (Darmstadt, Germany). All laminins (LN111, LN121, LN211, LN221, LN411, LN421, LN511, LN521, and LN332) were obtained from BioLamina AB (Stockholm, Sweden). $2\times10^3$/well HeLa cells were seeded in 96 wells/plates and then after 24 h, pretreated with neuraminidase (0.2 U/ml) or fibronectin (2 µg/ml) or laminins (2 µg/ml) in 100 µl of DMEM medium containing 10% FBS. At 24 h post-treatment, cells were infected with recH-1PV-EGFP (0.5 TU, GFP/cell) and grown for additional 27 h. Cells were then washed once with PBS, fixed in 3.7% formaldehyde for 5 min, permeabilized with 1% Triton X-100 for 10 min, and stained with DAPI for 2 min. Fluorescence images of GFP positive cells were acquired with a BZ-9000 fluorescence microscope from Keyence Corporation (Osaka, Japan) with 10× objective.

Gain of Function Experiments

2×10⁴ HeLa cells were seeded in 24-well plate and then transfected with either vector alone or vector expressing LAMC1. At 46 h post-transfection, cells were infected with recH-1PV-EGFP (0.25 TU, GFP/cell) and grown for additional 24 h before to be processed as described above.

Cell Viability Assay

In siRNA knock-down experiments, the siRNAs mentioned above were spotted onto 96 well plates (1 siRNA per well) in triplicate and then reverse transfected in $2.5 \times 10^3$ HeLa cells. After 24 h, the cellular medium was exchanged and cells were grown for additional 48 h before to be infected with H-1PV (MOI 0.25 pfu/cell). At 72 h post-infection, cell viability was measured using CellTiter-Glo 2.0 assay (Promega, Madison, WI, USA). Briefly, cells were brought at room temperature, and the cultural medium was replaced with 100 μl of CellTiter-Glo 2.0 reagent (diluted 1:2 in cellular medium). Plates were placed on an orbital shaker for 2 min and then incubated with the solution for 10 min. Luminescence was read on an LB 943 Mithras$^2$ plate multimode reader (Berthold Technologies, Bad Wildbad, Germany). For heparin treatment experiment, HeLa cells were seeded into 96-well plate at density of $2.5 \times 10^3$ cells per well. After 24 h, heparin (100 μg/ml) was added to the medium and cells were grown for additional 24 h before to be infected with H-1PV (MOI 1, pfu/cell) previously pre-incubated with heparin for 15 min at room temperature. 96 h post-infection, cell viability was measured using CellTiter-Glo 2.0 (Promega, Madison, USA) as described above.

Statistical Analysis

The statistics on data set were calculated with an unpaired two-tailed Student's t-test using Graphpad Prism software or Microsoft Excel 2016, unless otherwise mentioned. Results are shown as mean values of triplicates ±s.d of a representative experiment or average of at least two replicated experiments.

Cell Proliferation Assay: NCI-60 Cancer Cell Lines Screening

Cell proliferation was monitored in real-time by using a RTCA-MT xCELLigence system (ACEA Biosciences Inc., San Diego, California, US) including 6×96-well electronic microtiter plates modules. Cells were seeded on 96-well E-Plate at a density of 4,000-16,000 cells/well (according to cell doubling rate) cells. 24 h to 72 h later, cells were infected with increasing amounts of H-1PV wild-type, ranging from multiplicity of infection (MOI=pfu/cell) of 0.05 to 50 pfu/cell (0, 0.05, 0.25, 0.5, 1, 5, 10 and 50). Growth of untreated and H-1PV infected cells was monitored in real-time for 5-7 days every 30 min and expressed as normalized cell index (CI), a parameter proportional to the number of attached cells per well and, therefore, strictly correlated with cell proliferation rate. At least three replicates were carried out for every condition. The six in suspension-growing leukaemia cell lines belonging to the NCI 60 cell lines panel were excluded from the screening because they are not compatible with the xCELLigence system, which can only monitor the growth of adherent cell lines.

Determination of the EC50 Value Relative to H-1PV Infection in the NCI-60 Cancer Cell Lines Screening A two-step data analysis approach[23] was applied to derive, for each NCI-60 cell line, EC50 values (virus concentration killing 50% of cells) for the 4 post-infection time points 24, 48, 72 and 96 hours. In step one of the approach, one-way ANOVA followed by post hoc Dunnett contrast testing (Dunnett 1955) of the contrast 'MOI 0 versus MOI 50' was carried out to assess whether H-1PV amount has a consistent effect on normalized cell index. No consistent effect was concluded if (a) ANOVA failed to demonstrate a global effect of H-1PV amount on normalized cell index ($p>0.05$) or (b) a global but inconsistent effect was revealed by ANOVA ($p\leq0.05$) followed by post hoc Dunnett contrast test ($p>0.05$). No Dunnett contrast testing was needed and was thus not performed for case (a). If no consistent effect was found in step one, no EC50 value was reported for the respective combination of NCI-60 cancer cell line and post-infection time point. Otherwise, in step two of the approach, the EC50 value was computed by fitting the 4-parameter log-logistic model to the concentration-response data (concentration: H-1PV amount, response: normalized cell index) that was obtained for the respective combination of NCI-60 cancer cell line and post-infection time point. As negative values for the normalized cell index are biologically not meaningful, the lower asymptote of the 4-parameter log-logistic model function was restricted to be $\geq 0$. No EC50 value was reported in four situations: (1) if the estimated EC50 value exceeded the maximum H-1PV amount tested (e.g., MOI 50), the obtained EC50 estimate was considered unreliable and was thus not reported; (2) if the distance between the lower asymptote c and the upper asymptote d of the fitted concentration-response curve was too small (e.g., if $c>0.7*d$), the observed effect of H-1PV amount on normalized cell index was considered to be irrelevant and the EC50 estimate was thus not reported; (3) if an increasing concentration-response curve which is not interpretable from a biological point of view was obtained from the log-logistic model fit; and (4) in situations in which the 4-parameter log-logistic model function failed to fit the concentration-response data. EC50 computation was conducted with the open-source statistical software environment R, version 2.14.2 (www.R-project.org)

LDH Assay

Cancer cell lines were plated in 96-well plates at the density of 4,000 cell/well and grown for 24 hours. Cells were then infected with H-1PV and grown for additional 72 hours in DMEM medium supplemented with 5% of heat-inactivated bovine serum (100 μl/well). Virus-induced cell lysis was determined by the amount of lactate dehydrogenase (LDH) released into the culture medium using the Cytotox 96 non-radioactive cytotoxicity assay kit™ (from Promega, Mannheim, Germany) as previously described[29].

RNA Isolation

Glioblastoma derived cell lines were grown in 6 well plates in DMEM medium supplemented with 10% FBS and 2 mM L-glutamine at the density of 50,000 cells/well. After 20 hours, cells were collected and total RNA was isolated from cell pellets using the ZYMO RESEARCH Quick-RNA miniprep kit (ZYMO RESEARCH CORP, CA, USA) according to manufacturer's instructions.

nCounter Gene Expression Analysis nCounter target gene expression analysis was carried out as recommended by nanoString Technologies (Seattle, WA, USA). The nCounter technology allows for multiplexed gene expression analysis based on simultaneous hybridization and digital quantification of fluorescently-labelled oligonucleotide probes[30]. The probe set used for the analysis is described in Table 1. All RNA samples were quantified by using Qubit™ RNA HS assay kit and quality control was performed using the Agilent RNA6000 Nanokit on an Agilent 2100 Bioanalyzer system. Samples were subjected to overnight hybridization. In brief, 50 ng of total RNA were used as input material for probe set hybridization at 65° C. Up to 7 µl of total RNA samples were combined with 2 µl of nCounter customized TagSet, 5 µl of hybridization buffer and 0.5 µl Probe A plus 0.5 µl Probe B for a total reaction volume of 15 µl. Samples were incubated for 20 hours, cooled down to 4° C. and then purified and immobilized on a cartridge. Readout of the experiment was performed using the SPRINT™ Profiler from nanoString Technologies (Seattle, WA). Normalization and evaluation of data were carried out using the nSolver Analysis Software (version 4.0) provided by nanoString Technologies (www.nanostring.com/products/analysis-software/nsolver). Stably expressed reference genes were chosen for normalization based on the Normfinder method[31].

1% BSA with the addition of 1 µg/ml of puromycin. Single-cell clones were expanded and confirmed for LGALS1 knock out by Western Blot analysis. To generate the NCH125-Control cell line, the control plasmid pCRISPR/Cas9 scrambled-gRNA not targeting any human genes (sc-418922; Santa Cruz, Heidelberg, Germany) was used for the transfection.

Gain of Function in NCH125-LGALS1KO Cell Line

Both NCH125-Control and NCH125-LGALS1KO were seeded in 6-well plates at the density of 300,000 cells/well. The day after, cells were transfected with 2.5 µg of plasmid carrying the LGALS1 gene fused to mCherry (mCherry-Galectin-C-18, a gift from Michael Davidson; Addgene #62745) using Lipofectamine LTX reagent (Thermo Fisher Scientific, Carlsbad, CA, USA) according to manufacturer's instructions. On the next day, the medium was replaced by complete cellular medium and cells were grown for additional 24 hours. Virus transduction was carried out by infecting cells with recH-1PV-EGFP (0.3 TU, GFP/cell) for 24 hours. Cells were then fixed with 3.7% formaldehyde for 10 min, permeabilised with 1% Triton X-100 for 5 min. Cell nuclei were stained with DAPI. EGFP positive cells were analysed with the BZ-9000 fluorescence microscope (Keyence). At least 1,000 cells were analysed for EGFP signal.

β-Lactose Treatment 40,000 HeLa cells were seeded in 24 wells/plates and then pre-incubated with 200 mM β-lactose (#L3750, SIGMA-

TABLE 1

Elements probe set design. Target sequences and accession numbers of genes interrogated by nCounter expression profiling are indicated in the table. ATCB1, RPL19 and GAPDH represent reference genes for expression data normalization

| Gene | Accession | Target Sequence |
| --- | --- | --- |
| ACTB | NM_001101.2 | TGCAGAAGGAGATCACTGCCCTGGCACCCAGCACA<br>ATGAAGATCAAGATCATTGCTCCTCCTGAGCGCAAG<br>TACTCCGTGTGGATCGGCGGCTCCATCCT |
| RPL19 | NM_000981.3 | CCAATGCCCGAATGCCAGAGAAGGTCACATGGATG<br>AGGAGAATGAGGATTTTGCGCCGGCTGCTCAGAAG<br>ATACCGTGAATCTAAGAAGATCGATCGCCA |
| GAPDH | NM_001256799.1 | GAACGGGAAGCTTGTCATCAATGGAAATCCCATCAC<br>CATCTTCCAGGAGCGAGATCCCTCCAAAATCAAGTG<br>GGGCGATGCTGGCGCTGAGTACGTCGTG |
| LAMC1 | NM_002293.3 | TCTTGATAGGAAAGTGTCTGACCTGGAGAATGAAGC<br>CAAGAAGCAGGAGGCTGCCATCATGGACTATAACC<br>GAGATATCGAGGAGATCATGAAGGACATT |
| LGALS1 | NM_002305.3 | GGTGCGCCTGCCCGGGAACATCCTCCTGGACTCAA<br>TCATGGCTTGTGGTCTGGTCGCCAGCAACCTGAATC<br>TCAAACCTGGAGAGTGCCTTCGAGTGCGA |

Generation of NCH125-LGALS1KO and NCH125-Control Cell Lines

For the generation of NCH125-LGALS1KO stable cells, 200,000 cells were seeded in a 6-well plate and next day transfected with 2 µg of galectin-1 Double Nickase Plasmid ([h]sc-400941-NIC, Santa Cruz, Heidelberg, Germany) using Lipofectamine LTX transfection reagent (Thermo Fisher Scientific, Carlsbad, CA, USA). Selection of positive clones was performed for 72 hours in DMEM cell culture medium supplemented with 10% FBS, 2 mM L-glutamine, ALDRICH Co., St. Louis, MO, USA) for 30 min before to be infected with recH-1PV-EGFP (0.3 TU, GFP/cell). At 4 hours post-infection, the medium was replaced by complete cellular medium supplemented with β-lactose and cells were grown for additional 20 h. Cells were then fixed with 3.7% formaldehyde for 10 min, permeabilised with 1% Triton X-100 for 5 min and cell nuclei stained with DAPI. Cells were analysed with the BZ-9000 fluorescence microscope (Keyence). At least 1,000 cells were analysed for the calculation of the percentage of EGFP positive cells.

Example 2: SiRNA Library Screening

The inventors have performed a siRNA library screening using the cervical carcinoma derived HeLa cell line (FIG. 1). Two sets of cells were reverse transfected with controls siRNAs or with the druggable siRNA library comprising siRNA pools targeting a total of 6,961 different genes (druggable genome, 4 siRNAs/pool, 1 pool/gene) and then grown for 48 h to allow efficient gene silencing. One set of cells was then left untreated to control the intrinsic cytotoxicity of every transfected siRNA pool while the other set of cells was infected with recH-1PV-EGFP. This replication deficient recombinant parvovirus shares the same capsid of the wild type virus, but harbours the EGFP reporter gene under the control of the natural PV P38 promoter[24]. This promoter is specifically activated by the PV NS1 protein and therefore its expression which correlates with the EGFP signal is a measurement of the virus transduction abilities. At 24 h after infection, cells were fixed and EGFP signal and cell viability measured (FIG. 1 A). The EGFP signal obtained in cells transfected with control scramble siRNA was used as baseline to normalize the percentage of EGFP signal obtained in cells individually transfected with siRNA pools for each of the 6,961 target genes. Two genes, namely LAMC1 and LGALS1 were identified as top candidates for modulating the H-1 PV life cycle (FIG. 1 B). Silencing of both genes reduced H-1 PV transduction by more than 70% providing first evidence that the two genes represent strong activators of the H-1 PV life cycle. By analyzing The Cancer Genome Atlas (TCGA, cancergenome.nih.gov) we found that LAMC1 and LGALS1 exhibited positive Cox regression coefficients (LAMC1's range: from 0.19 to 0.86; LGALS1's range: from 0.19 to 0.39), which indicates that their overexpression is associated with shorter median overall survival (FIG. 1 C) in patients suffering from certain tumour types. In particular, according to the inventors' analysis, LAMC1 overexpression may be considered as a marker of poor prognosis in kidney renal papillary cell carcinoma (KIRP), brain lower grade glioma (LGG), stomach adenocarcinoma (STAD), bladder urothelial carcinoma (BLCA), cervical squamous cell carcinoma and endocervical adenocarcinoma (CESC), rectum adenocarcinoma (READ) and lung adenocarcinoma (LUAD). On the other hand, LGALS1 overexpression is associated with poor prognosis in LGG, kidney renal clear cell carcinoma (KIRC), acute myeloid leukemia (LAML) and BLCA (P-value<0.05) (FIG. 1C).

Example 3: Laminin-γ1 Chain is Involved in H-1PV Cellular Surface Binding and Entry The library screening identified LAMC1 gene as a strong candidate involved in the early steps of H-1PV life cycle. LAMC1 encodes for the laminin-γ1 chain, which together with α and β chains form laminins, a family of a total sixteen heterotrimeric glycoproteins of the extracellular matrix. Laminins are the major component of the basement membranes and are linked to the cell surface by extracellular adaptor proteins, sulphated glycolipids and receptor proteins e.g. integrins or the dystroglycan glycoprotein complex. The inventors hypothesize that laminins containing the laminin-γ1 chain may be part of a polypeptide complex that mediates H-1PV cell surface binding and entry. Further supporting this hypothesis is the fact that laminin adhesion to cell surface requires glycan chains bearing terminal sialic acid. Indeed, it was shown that H-1PV cell surface binding/entry is sialic acid dependent[17], as neuraminidase treatment, which cleaves sialic acid groups from glycoproteins, dramatically blocked H-1PV infectivity[17]. To provide further evidence on the biological role of the laminin-γ1 chain in H-1PV cell membrane recognition and entry, as a first approach, the inventors silenced the expression of LAMC1 using two siRNAs targeting two distinct regions of the gene and checked H-1PV ability to bind to and penetrate into the cells (virus cell uptake assay). To this end, Hela cells were transfected with LAMC1 and control siRNAs and after 46 h infected with H-1PV. After 4 h, cells were washed to remove unbound viral particles and those associated with the cells were analysed by qPCR. A strong decrease in virus cell uptake was observed in cells transfected with LAMC1 siRNAs in comparison to control siRNA (FIG. 2 A). Hela cells transfected with siRNAs as above, were also used for a virus transduction assay in which cells were infected with recH-1PV-EGFP, the same recombinant virus previously used for the siRNA library screening. In agreement with the results obtained from the siRNA library screening in which a pool of 4 LAMC1 siRNAs was used, also individual LAMC1 siRNAs strongly decreased H-1PV transduction (FIG. 2 B).

Example 4: Silencing of LAMC1 Protects HeLa Cells from H-1PV Oncolysis

The inventors evaluated the impact of siRNA specific LAMC1 knock down on H-1PV induced oncotoxicity by measuring cell viability in siRNA transfected HeLa cells. After 72 h from infection, untransfected cells or siRNA control transfected cells were efficiently killed by H-1PV (77.2% and 71.7% reduction of cell viability respectively). On the contrary, Hela cells transfected with LAMC1 siRNA were significantly more resistant to H-1PV induced cytotoxicity (FIG. 3).

Example 5: Competition Experiment with Antibodies Against Laminin-γ1 Confirms the Involvement of the Protein in H-1PV Cell Membrane Recognition and Entry The inventors performed competition experiments using a specific anti-laminin-γ1 antibody in order to block H-1PV cell entry. HeLa cells, pre-incubated with laminin-γ1 antibody, were significantly less susceptible to H-1PV infection in comparison to cells pre-incubated with control IgG isotype or control antibody against unrelated Ephrin type B receptor (EPHB2), a receptor tyrosine kinase transmembrane glycoprotein (FIG. 4).

Example 6: CRISPR/Cas9 LAMC1 Gene Knock-Down Decreases H-1PV Virus Entry

The inventors generated a stable LAMC1 KD HeLa cell line in which the LAMC1 gene expression was knocked-down via CRISPR/Cas9 genome editing technology. A strong decrease of H-1PV infection was observed in LAMC1 KD cells compared to parental HeLa cells. This reduction of H-1PV infectivity was rescued by re-introduction of the LAMC1 gene in these cells via plasmid transfection (FIG. 5).

Example 7: Overexpression of the LAMC1 Gene Increases H-1PV Infectivity

The inventors next carried out a gain of function experiment by overexpressing exogenous LAMC1 in parental HeLa cells. They observed a 62% increase in H-1PV cellular uptake by overexpressing LAMC1 compared to the vector alone (FIG. 6A). Under similar conditions, the inventors evaluated HeLa cells transiently transfected with LAMC1 expressing plasmid for H-1PV transduction. A significant (2.2 fold) increase of H-1PV transduction was observed (120.6%) in HeLa cells transfected with LAMC1 plasmid compared to the vector alone (FIG. 6B).

Example 8: Heparin Treatment Impairs H-1PV Infectivity

Laminins contain several binding sites for heparin[25, 26], which is used in clinic as an anticoagulant agent. The inventors hypothesize that treatment with heparin may interfere with H-1PV infectivity by competing with the virus for the binding to laminin. In order to test this hypothesis, HeLa cells were pre-treated with different concentrations of soluble heparin before being infected with H-1PV. Neuraminidase was used as a positive control for its ability to prevent H-1PV cell binding/entry by cleaving surface sialic acid. Furthermore, the inventors also pre-treated the cells with heparinase III, an enzyme known to degrade heparin sulfate (HS) glycosaminoglycan chains which are abundant components of the cell surface and extracellular matrix. As expected, treatment with neuraminidase strongly inhibited H-1PV infectivity, confirming the importance of sialic acid for H-1PV entry. Incubation with heparin but not heparinase III, also decreased the ability of H-1PV to penetrate into the cells (FIG. 7 A). The inhibitory effect was proportional to the concentration of heparin used (FIG. 7 B). In agreement with these results, heparin treatment also reduced H-1PV transduction efficacy (FIG. 7 C) and protected the cells from H-1PV induced oncolysis (FIG. 7 D). These results provide additional evidence that laminins play an essential role in H-1PV infectivity at the level of virus cell entry.

Example 9: Treatment with Soluble Laminins Blocks H-1PV Cell Uptake

Laminins are composed of one α, one β and one γ chain assembled together through disulfide bonds forming a cruciform structure (1). Five α chains (α1-5), three β chains (β1-3) and three γ chains (γ1-3) have been described to date, accounting for the 16 known laminin trimeric isoforms (Laminin 1-16). The identification of laminin-γ1, raised the question of which other laminin-chains may be part of the laminins involved in H-1PV cell binding/entry. In order to address this issue, the inventors carried out competition experiments using a panel of commercially available purified soluble trimeric laminins, namely laminins 111, 121, 211, 221, 411, 421, 511, and 521 all containing the γ1 chain, and laminin 332 containing α3 β3 γ2 chains. As a control the inventors used soluble fibronectin, another common constituent of the extracellular matrix. Cells were preincubated with laminins or fibronectin before being infected with the recH-1PV-EGFP virus. A significant strong decrease of virus transduction was observed in cells pre-treated with all laminins containing the γ1 chain but not with laminin 332 (slight decrease) or fibronectin, suggesting that the γ1 chain is required for H-1PV binding to laminins and that different laminin polypeptides may be involved in the virus cell binding/entry process.

Example 10: Silencing of LAMB1 Impairs H-1PV Infectivity

In order to confirm the involvement of laminins in H-1PV cell binding/entry the inventors decided to silence the expression of another member of the laminin gene family: the LAMB1 gene encoding the laminin-β1 chain. The choice of LAMB1 gene was suggested by the fact that in our siRNA library screening, its silencing by siRNA pool, was also associated with a strong decrease in H-1PV transduction efficiency (about 60% in comparison with control siRNA, see example 13), scoring as second-best gene after LAMC1 among those encoding laminin chains represented in the library (data not shown).

Similarly, to the results obtained with LAMC1, also the use of two different siRNAs targeting two distinct regions of the LAMB1 gene strongly decreased H-1PV cell binding/entry and transduction (FIGS. 9 A and B). These results provide further evidence that laminins mediate H-1PV cell membrane recognition and entry.

Example 11: Galectin-1 is Also Involved in H-1PV Entry

The LGALS1 gene encoding for lectin galactoside-binding soluble 1 protein (alias Galectin-1) was another gene identified by our siRNA library screening as a top activator of the H-1PV life cycle (FIG. 1). In order to validate these results, as previously shown for LAMC1 and LAMB1, the inventors used two independent siRNAs for the silencing of LGALS1. LGALS1 silencing was associated with a significant decrease in H-1PV cellular uptake (FIG. 10 A) and transduction (FIG. 10 B) in comparison to control siRNA. These results provide evidence that galectin-1 may play an important role in H-1PV cell entry pathway.

Example 12: Silencing of LAMC1, LAMB1 and LGALS1 Genes Protected HeLa Cells from H-1PV Oncolysis The inventors' results show that siRNA mediated silencing of LAMC1 protects HeLa cells from H-1PV induced oncotoxicity (FIG. 3). Based on this results, the inventors evaluated the impact of siRNA mediated LAMB1 and LGALS1 silencing on H-1PV induced oncotoxicity by measuring cell viability in siRNA transfected HeLa cells. Treatment with LAMC1 siRNA was used as a positive control. Under same experimental conditions as described above in FIG. 3, untransfected cells or siRNA control transfected cells were efficiently killed by H-1PV (77.7% and 69.5% reduction of cell viability respectively). On the contrary, Hela cells transfected with LAMC1, LAMB1 or LGALS1 siRNAs were significantly more resistant to H-1PV induced cytotoxicity (FIG. 11).

Figure 12:
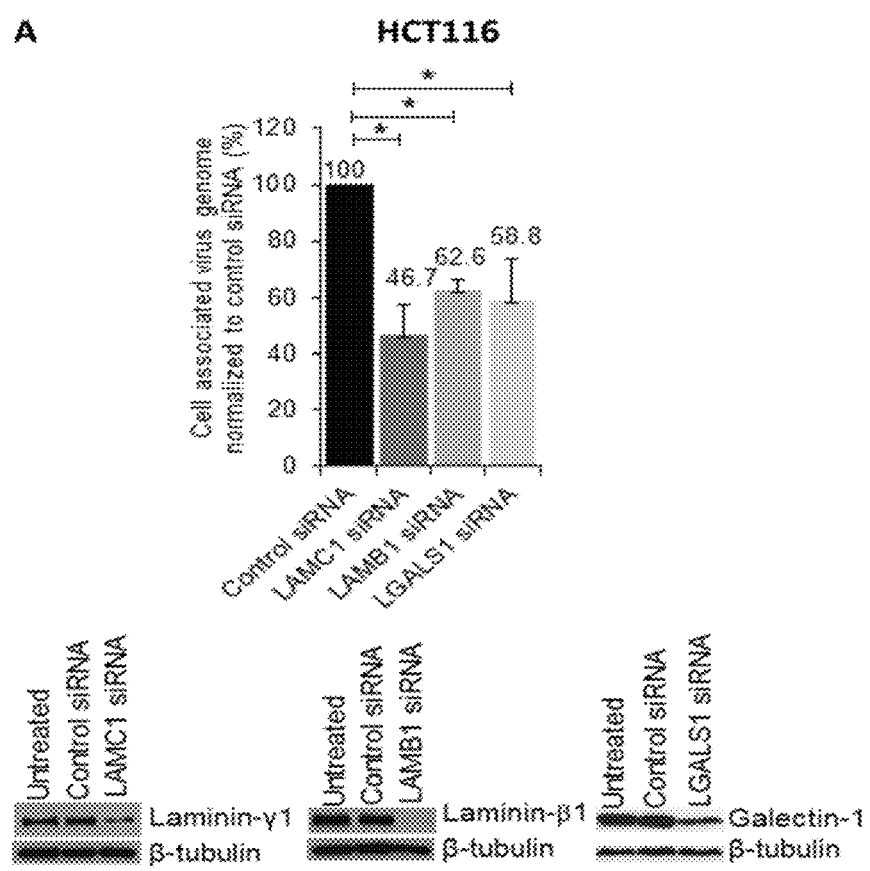
Figure 12:
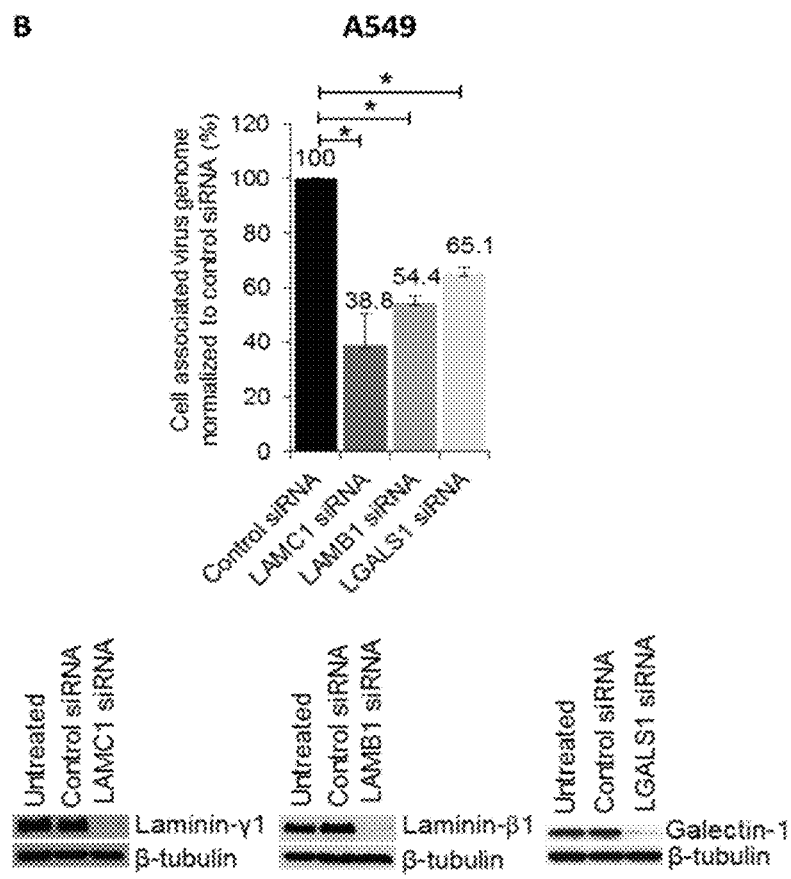

Example 13: Confirmation that LAMC1, LAMB1, and LGALS1 are Involved in H-1PV Cell Surface Binding/Entry in Other Cancer Cell Lines The inventors assessed the role of LAMC1, LAMB1, and LGALS1 in H-1PV cellular uptake in two other cancer cell lines, namely HCT116 (colorectal carcinoma) and A549 (lung adenocarcinoma). As shown before for HeLa cells (FIG. 2), specific silencing of LAMC1, LAMB1, and LGALS1 significantly decreased H-1PV cellular uptake in both cell lines compared to control siRNA (FIGS. 12 A and B). These results provide further evidence that the three genes are involved in the H-1PV life cycle at the level of virus entry.

Example 14: The Expression Levels of LAMC1 Directly Correlates with the Oncolytic Activity of H-1PV H-1PV can infect and kill a broad range of cancer cell lines derived from different tumour entities[8]. However, not all cancer cells are killed efficiently by the virus, being some of them less susceptible or even completely refractory to H-1PV infection. As the parvovirus life cycle strictly relies on host cell factors, differences in permissiveness may be due to the lack or functional defects of some of these critical modulators.

NCI-60 cancer cell line screenings is a powerful approach used for the identification of permissiveness factors (e.g. cellular receptor) involved in a certain virus life cycle[13, 16]. This methodology relies on the comparison of the gene expression profiling of permissive versus resistant cancer cells for the identification of candidates.

In order to identify modulators of H-1PV life cycle, therefore, as independent and complementary approach to our siRNA library screening the inventors screened 53 cancer cell lines belonging to the NCI-60 cell line panel, for sensitivity to H-1PV-induced oncolysis.

Figure 13:
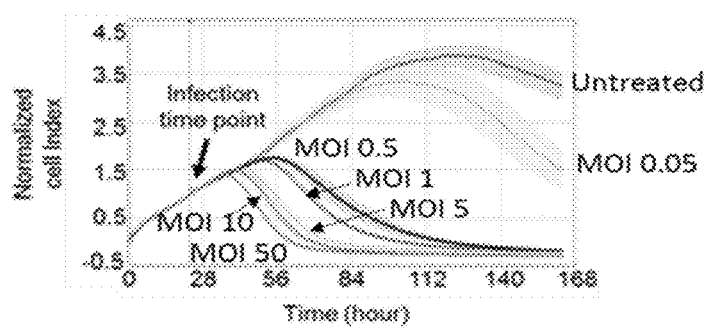
Figure 13:
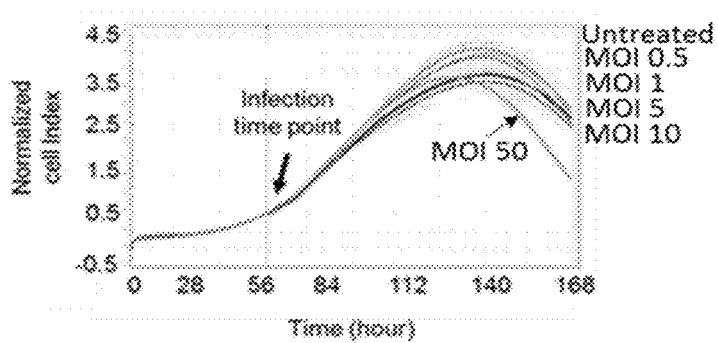
Figures 13B, 13C:
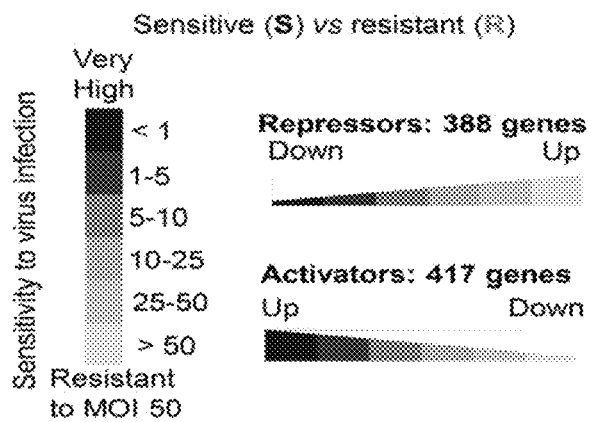

The NCI 60 cell line panels includes cancer cell lines derived from different tumour types, namely lung, central nervous system (CNS), melanoma, breast, renal, ovarian, colon, prostate and leukemia. The screening was performed using the XCELLigence system which allows real time monitoring of cell proliferation. Cells were seeded in a 96-well E-plate and kept untreated or infected with increasing amounts of H-1PV ranging from MOI of 0.05 to 50 (FIG. 13 A). Growth of untreated and H-1PV infected cells was monitored every 30 min for a total of 168 hours and expressed as normalized cell index (CI) which is a direct measure of the number of cells present in the well. The 6 in suspension growing leukemia cancer cell lines were excluded from the screening, because not compatible with the XcellIgence system which can monitor the growth of only adherent-growing cell lines. The virus concentration causing 50% of cell death (EC50) was then calculated at 24, 48, 72 and 96 hours post-infection. 36 cancer cell lines of various origins were found to be highly susceptible to H-1PV infectivity (cytostatic and cytotoxic effects were observed at MOIs≤10). 11 cancer cell lines resulted low sensitive (killed only when the virus was used at MOI≥10-50) while a total of 6 cancer cell lines were resistant to the highest H-1PV concentration used (MOI 50) (FIG. 13 B). Cancer cell lines derived from lung, CNS, breast cancers and melanoma were among the most sensitive to H-1PV infection with the only exceptions of LOX IMVI (melanoma) and MCF7 (breast cancer) which were refractory to the highest viral concentration used (MOI 50). On the contrary, cell lines derived from colon and ovarian cancers were among the most resistant to H-1PV infection with HCT-15, HCC-2998, COLO 205 (colon carcinomas) and OVCAR-3 (ovarian cancer) resistant to the highest concentration of virus used (data not shown).

In order to identify candidate genes modulating H-1PV life cycle, two post bioinformatics analyses were carried out. Firstly, the inventors performed DTP-COMPARE analysis [dtp.cancer.gov/databases_tools/compare.htm] using the EC50 values (72 hours) as an input (seed file). By this analysis, the gene expression profiles (based on microarray results present in the public available database) of H-1PV sensitive versus less sensitive or resistant cancer cell lines were compared and correlated with their susceptibility to H-1PV infection considering the all gradient of EC50 values. 388 genes were identified as putative repressors (up-regulated in H-1PV low sensitive/resistant cancer cell lines, down-regulated in high/medium sensitive cancer cell lines) and 417 genes as possible activators (p<0.05) (FIG. 13 C). In the second more stringent analysis the gene expression microarray data from the NCI-60 cancer cell lines were first mined utilizing the CellMiner bioinformatic tool [discover.nci.nih.gov/cellminer/]. The retrieved data were then harmonized, pre-processed, and transformed by merging gene expression data obtained by comparing only the 6 resistant (scored as 0) versus the 47 cancer cell lines sensitive to H-1PV infection (scored as 1). The differential expression analysis based on Limma+B&H correction was then applied for the identification of candidate genes involved in H-1PV life cycle (p<0.05). This analysis provided 82 putative activators (FIG. 13 D). The two lists of activators obtained from DTP-COMPARE and differential expression analyses were merged and by this means 57 common H-1PV activators were identified (FIG. 13 E) which significantly correlate with the ability of H-1PV of killing the 53 cancer cell lines screened. Among these factors the inventors found LAMC1 and LGALS1, two members of the laminin and galectin families.

Example 15: Data Sets Integration Identified LAMC1 and LGALS1 as Activators of H-1PV Life Cycle The inventors further integrated the 151 activators identified from the siRNA library screening (FIG. 1) with the 57 activators obtained by NCI-60 cancer cell lines screening (FIG. 13). Of the latter, only 23 were also represented in the siRNA library used for the screening. The only two genes identified in common from the merging of the two different data sets, were LAMC1 and LGALS1 (FIG. 14) confirming the crucial role of these two genes in the H-1PV life cycle.

Example 16: CRISPR/Cas9 Mediated LGALS1 Gene Knock-Out Impairs H-1PV Transduction which is Rescued by Re-Introduction of the LGALS1 Gene In order to confirm the involvement of LGALS1 in H-1PV infection, inventors generated a stable LGALS1KO NCH125 glioma cell line in which the LGALS1 gene expression was knocked-out via CRISP/Cas9 genome editing technology (FIG. 15). Cells were infected with recH-1PV harbouring the EGFP gene. A strong decrease of H-1PV transduction was observed in LGALS1KO cells compared to NCH125-Control (established by using a control CRISPR/Cas9 plasmid encoding the Cas9 nuclease and a non-specific scrambled 20 nt guide RNA whose sequence does not recognize any human gene). This reduction of H-1PV transduction was rescued by re-introduction of the LGALS1 gene in these cells via plasmid transfection (FIG. 15). These results provide further evidence that the LGALS1 gene encoding for galectin-1 plays an essential role in H-1PV infection.

Example 17: LAMC1 and LGALS1 mRNA Expression Levels Correlate with the Ability of H-1PV to Induce Oncolysis in Glioblastoma Patient Derived Cell Lines The inventors showed that LAMC1 and LGALS1 play an essential role in H-1PV infection. The screening of 53 cancer cell lines (NCI-60 cancer cell line panel) for their susceptibility to H-1PV oncolysis, revealed a statistical significant positive correlation between the expression levels of LAMC1 and LGALS1 genes and the ability of the virus to kill cancer cells, providing strong evidence that the two genes may be used as biomarkers for predicting the success of virus treatment. Based on these results, the inventors further analysed six glioblastoma derived cell lines for their sensitivity to H-1PV oncolysis. Cells were infected for 72 h with H-1PV at MOI 10. Two cell lines, namely NCH125, NCH37 were killed by more than 60% by the virus. On the contrary, U251, LN308, T98G, and A172-MG were less susceptible to H-1PV oncolysis and killed by less than 30%. (FIG. 16 A). Total RNA was isolated from these cell lines and subjected to Nanostring analysis to measure LAMC1 and LGALS1 gene expression levels. In agreement with previous results, a positive correlation between the LAMC1 and LGALS1 mRNA levels and H-1PV oncolysis was also found in glioblastoma cell lines, being the cell lines expressing higher levels of the two genes more sensitive to H-1PV infection (FIG. 16 B).

Example 18: β-Lactose Treatment Impairs H-1PV Transduction

Galectins constitute a family of lectins containing a conserved carbohydrate recognition domain with ability to interact with β-galactosides, such as lactose. For instance, it was found that β-lactose binds to galectin-1 inducing conformational changes which affect the functionality of the protein[28]. The inventors consider that β-lactose by interacting with galectin-1 may decrease H-1PV infection/transduction. HeLa cells were pre-treated with 200 mM of β-lactose before to be infected with recH-1PV-EGFP. In agreement with their consideration, pre-treatment with β-lactose significantly reduced H-1PV transduction efficacy (FIG. 17).

REFERENCES

1 Chiocca, E. A. & Rabkin, S. D. Oncolytic viruses and their application to cancer immunotherapy. Cancer Immunol Res 2, 295-300, doi:10.1158/2326-6066.CIR-14-0015 (2014).
2 Russell, S. J., Peng, K. W. & Bell, J. C. Oncolytic virotherapy. Nat Biotechnol 30, 658-670, doi:nbt.2287 [pii]10.1038/nbt.2287 (2012).
3 Lichty, B. D., Breitbach, C. J., Stojdl, D. F. & Bell, J. C. Going viral with cancer immunotherapy. Nat Rev Cancer 14, 559-567, doi:10.1038/nrc3770 (2014).
4 Lemay, C. G., Keller, B. A., Edge, R. E., Abei, M. & Bell, J. C. Oncolytic Viruses: The Best is Yet to Come. Curr Cancer Drug Targets 18, 109-123, doi:10.2174/1568009617666170206111609 (2018).
5 Marchini, A., Scott, E. M. & Rommelaere, J. Overcoming Barriers in Oncolytic Virotherapy with HDAC Inhibitors and Immune Checkpoint Blockade. Viruses 8, doi:10.3390/v8010009 (2016).
6 Andtbacka, R. H. et al. Talimogene Laherparepvec Improves Durable Response Rate in Patients With Advanced Melanoma. J Clin Oncol 33, 2780-2788, doi:10.1200/JCO.2014.58.3377 (2015).
7 Fountzilas, C., Patel, S. & Mahalingam, D. Review: Oncolytic virotherapy, updates and future directions. Oncotarget 8, 102617-102639, doi:10.18632/oncotarget.18309 (2017).
8 Marchini, A., Bonifati, S., Scott, E. M., Angelova, A. L. & Rommelaere, J. Oncolytic parvoviruses: from basic virology to clinical applications. Virol J 12, 6, doi:10.1186/s12985-014-0223-y (2015).
9 Geletneky, K. et al. Oncolytic H-1 Parvovirus Shows Safety and Signs of Immunogenic Activity in a First Phase I/IIa Glioblastoma Trial. Mol Ther 25, 2620-2634, doi:10.1016/j.ymthe.2017.08.016 (2017).
10 Nuesch, J. P., Lacroix, J., Marchini, A. & Rommelaere, J. Molecular pathways: rodent parvoviruses—mechanisms of oncolysis and prospects for clinical cancer treatment. Clin Cancer Res 18, 3516-3523, doi:1078-0432.CCR-11-2325 [pii]10.1158/1078-0432. CCR-11-2325 (2012).
11 Li, J. et al. Synergistic combination of valproic acid and oncolytic parvovirus H-1PV as a potential therapy against cervical and pancreatic carcinomas. EMBO Mol Med 5, 1537-1555, doi:10.1002/emmm.201302796 (2013).
12 Bar, S., Rommelaere, J. & Nuesch, J. P. PKCeta/Rdx-driven phosphorylation of PDK1: a novel mechanism promoting cancer cell survival and permissiveness for parvovirus-induced lysis. PLoS Pathog 11, e1004703, doi:10.1371/journal.ppat.1004703 (2015).
13 Di Pasquale, G. et al. Identification of PDGFR as a receptor for AAV-5 transduction. Nat Med 9, 1306-1312, doi:10.1038/nm929 nm929 [pii] (2003).
14 Pillay, S. et al. An essential receptor for adeno-associated virus infection. Nature 530, 108-112, doi:10.1038/nature16465 (2016).
15 Pillay, S. & Carette, J. E. Host determinants of adeno-associated viral vector entry. Curr Opin Virol 24, 124-131, doi:10.1016/j.coviro.2017.06.003 (2017).
16 Weller, M. L. et al. Epidermal growth factor receptor is a co-receptor for adeno-associated virus serotype 6. Nat Med 16, 662-664, doi:10.1038/nm.2145 (2010).
17 Allaume, X. et al. Retargeting of rat parvovirus H-1PV to cancer cells through genetic engineering of the viral capsid. J Virol 86, 3452-3465, doi:JVI.06208-11 [pii] 10.1128/JVI.06208-11 (2012).
18 Ros, C., Bayat, N., Wolfisberg, R. & Almendral, J. M. Protoparvovirus Cell Entry. Viruses 9, doi:10.3390/v9110313 (2017).
19 Singh, B., Fleury, C., Jalalvand, F. & Riesbeck, K. Human pathogens utilize host extracellular matrix proteins laminin and collagen for adhesion and invasion of the host. FEMS Microbiol Rev 36, 1122-1180, doi:10.1111/j.1574-6976.2012.00340.x (2012).
20 El-Andaloussi, N., Barbara, L., Serena, B., Rommelaere, J. & Marchini, A. Efficient recombinant parvovirus production with the help of adenovirus-derived systems. J. Vis. Exp. (Not Set), e3518, DOI: 10.3791/3518 (2011).
21 Raffelsberger, W. et al. RReportGenerator: automatic reports from routine statistical analysis using R. Bioinformatics 24, 276-278, doi:10.1093/bioinformatics/btm556 (2008).
22 Shalem, O. et al. Genome-scale CRISPR-Cas9 knockout screening in human cells. Science 343, 84-87, doi: 10.1126/science.1247005 (2014).
23 Kinsner-Ovaskainen, A., Prieto, P., Stanzel, S. & Kopp-Schneider, A. Selection of test methods to be included in a testing strategy to predict acute oral toxicity: an approach based on statistical analysis of data collected in phase 1 of the ACuteTox project. Toxicology in vitro: an international journal published in association with BIBRA 27, 1377-1394, doi:10.1016/j.tiv.2012.11.010 (2013).
24 El-Andaloussi, N. et al. Novel adenovirus-based helper system to support production of recombinant parvovirus. Cancer Gene Ther 18, 240-249, doi:cgt201073 [pii] 10.1038/cgt.2010.73 (2011).
25 Sakashita, S., Engvall, E. & Ruoslahti, E. Basement membrane glycoprotein laminin binds to heparin. FEBS Lett 116, 243-246 (1980).
26 Kouzi-Koliakos, K., Koliakos, G. G., Tsilibary, E. C., Furcht, L. T. & Charonis, A. S. Mapping of three major heparin-binding sites on laminin and identification of a novel heparin-binding site on the B1 chain. J Biol Chem 264, 17971-17978 (1989).

27 Ebrahim, A., Alawawi, Z., Mirandola, L., Rakhshanda, R., Dahlbeck, S., Nguyen, D., Jenkis, M., Grizzi, F., Cobos, E., Fugueroa, J., Chiriva-Internati, M., Galectins in cancer: carcinogenesis, diagnosis and therapy, Ann. Transl. Med., September 2(9), 88 (2014)

28 Nesmelova, I. V. et al. Lactose binding to galectin-1 modulates structural dynamics, increases conformational entropy, and occurs with apparent negative cooperativity. J Mol Biol 397, 1209-1230 (2010).

29 El-Andaloussi, N. et al. Generation of an adenovirus-parvovirus chimera with enhanced oncolytic potential. J Virol 86, 10418-10431 (2012).

30 Geiss, G. K. et al. Direct multiplexed measurement of gene expression with color-coded probe pairs. Nat Biotechnol 26, 317-325 (2008).

31 Andersen, C. L., Jensen, J. L. & Orntoft, T. F. Normalization of real-time quantitative reverse transcription-PCR data: a model-based variance estimation approach to identify genes suited for normalization, applied to bladder and colon cancer data sets. Cancer Res 64, 5245-5250 (2004).

32 Akache, B. et al., The 37/67-Kilodalton Laminin Receptor is a Receptor for Adeno-associated Virus Serotypes 8, 2, 3 and 9, J. of Virology, Vol. 80, No. 19, 9831-9836 (2006)

33 Krüger, L. et al., Augmented transgene expression in transformed cells using a parvoviral hybrid vector, Cancer Gene Therapy 15, 252-267 (2008)

34 Lacroix, J., et al., Oncolytic effects of parvovirus H-1 in medulloblastoma are associated with repression of master regultors of early neurgenesis, International J. of Cancer, 134, 703-716 (2014)

35 Di Pasquale, G. et al. Identification of PDGFR as a receptor for AAV-5 transduction. Nat Med 9, 1306-1312, doi:10.1038/nm929 [pii] (2003).

36 Pillay, S. et al. An essential receptor for adeno-associated virus infection. Nature 530, 108-112, doi:10.1038/nature16465 (2016).

37 Pillay, S. & Carette, J. E. Host determinants of adeno-associated viral vector entry. Curr Opin Virol 24, 124-131, doi:10.1016/j.coviro.2017.06.003 (2017).

38 Weller, M. L. et al. Epidermal growth factor receptor is a co-receptor for adeno-associated virus serotype 6. Nat Med 16, 662-664, doi:10.1038/nm.2145 (2010).

The invention is further described by the following numbered paragraphs:

1. Use of a biomarker selected from the group consisting of laminin and/or galectin for predicting the outcome of the treatment with parvovirus H1 (H-1PV) of a patient suspected to suffer from a cancer.
2. The use according to paragraph 1, wherein the laminin is LAMB1 and/or LAMC1.
3. The use according to paragraph 1, wherein the galectin is LGALS1.
4. A method of determining whether a patient suspected to suffer from cancer is a candidate for H-1PV therapy for said cancer comprising the step of subjecting a patient's biological sample to at least one assay to measure the presence of a biomarker selected from the group consisting of laminin and/or galectin.
5. The method according to paragraph 4, wherein the laminin is LAMB1 and/or LAMC1.
6. The method according to paragraph 4, wherein the galectin is LGALS1.
7. The method according to any of paragraphs 4 to 6, wherein the biological sample is a biopsy, blood, serum or plasma.
8. The method according to any of paragraphs 4 to 7, wherein the cancer is a solid tumour.
9. The method of paragraph 8, wherein the solid tumor is a brain cancer, lung cancer, breast cancer, skin cancer, colon cancer, pancreatic cancer or hepatocellular carcinoma.
10. The method according to paragraph 8, wherein the brain cancer is glioblastoma; wherein the lung cancer is non-small cell lung carcinoma; wherein the pancreatic cancer is pancreatic ductal adenocarcinoma, wherein the breast cancer is invasive ductal carcinoma, wherein the skin cancer is melanoma and wherein the colon cancer is colon adenocarcinoma.
11. The method of paragraph 10, wherein the non-small lung carcinoma is lung adenocarcinoma or lung squamous cell carcinoma.
12. Use of a kit for predicting whether a patient suspected to suffer from cancer is a candidate for H-1PV therapy, which kit comprises:
   (a) means for measuring the level of a biomarker selected from the group consisting of laminins and/or galectins; and
   b) optionally, a label giving instructions for the use of said kit in predicting whether a patient suspected to suffer from cancer is a candidate for H-1PV therapy.

Having thus described in detail preferred embodiments of the present invention, it is to be understood that the invention defined by the above paragraphs is not to be limited to particular details set forth in the above description as many apparent variations thereof are possible without departing from the spirit or scope of the present invention.

What is claimed is:

1. A method of detecting an elevated level of a biomarker as compared with a predetermined reference level of the biomarker for determining whether a human patient suspected to suffer from cancer is a candidate for H-1PV therapy for said cancer, and treatment of said cancer thereof, comprising;
   (a) obtaining a biological sample from the patient, the biological sample comprising a tissue biopsy, blood sample, serum sample, or plasma sample; and
   (b) subjecting the patient's biological sample to at least one assay to measure the presence of the biomarker; and
   (c) detecting the elevated level of the biomarker when the measured level of the biomarker exceeds the predetermined reference level of the biomarker by at least threefold,
   whereby detecting the elevated level of the biomarker as compared with that of the predetermined reference level of the biomarker indicates that the patient will benefit from a H-1PV therapy; and
   (d) administering H-1PV therapy to the patient having the elevated level of the biomarker;
   wherein the biomarker comprises laminin and/or galactin; and
   wherein the predetermined reference level of the biomarker is determined as a value between the 25th and 75th percentile of the overall distribution of biomarker measurements from samples obtained from healthy individuals or from a population of patients within the same disease entity.

2. The method according to claim 1, wherein the laminin is LAMB1 and/or LAMC1.

3. The method according to claim 1, wherein the galectin is LGALS1.

4. The method according to claim 1, wherein the cancer is a solid tumour.

5. The method of claim 4, wherein the solid tumor is a brain cancer, lung cancer, breast cancer, skin cancer, colon cancer, pancreatic cancer, or hepatocellular carcinoma.

6. The method according to claim 5, wherein the brain cancer is glioblastoma; wherein the lung cancer is non-small cell lung carcinoma; wherein the pancreatic cancer is pancreatic ductal adenocarcinoma; wherein the breast cancer is invasive ductal carcinoma; wherein the skin cancer is melanoma; and wherein the colon cancer is colon adenocarcinoma.

7. The method of claim 6, wherein the non-small lung carcinoma is lung adenocarcinoma or lung squamous cell carcinoma.

8. The method according to claim 1, wherein the cancer is selected from kidney renal papillary cell carcinoma (KIRP), brain lower grade glioma (LGG), stomach adenocarcinoma (STAD), bladder urothelial carcinoma (BLCA), cervical squamous cell carcinoma, endocervical adenocarcinoma (CESC), and rectum adenocarcinoma (READ).

9. The method according to claim 1, wherein the cancer from brain lower grade glioma (LGG), kidney renal clear cell carcinoma (KIRC), and acute myeloid leukemia (LAML).

* * * * *

SEQUENCE LISTING

```
<160> NUMBER OF SEQ ID NOS: 11

<210> SEQ ID NO 1
<211> LENGTH: 19
<212> TYPE: RNA
<213> ORGANISM: Artificial Sequence
<220> FEATURE:
<223> OTHER INFORMATION: siRNA

<400> SEQUENCE: 1
gaatggttac caatctacc
```

<210> SEQ ID NO 2
<211> LENGTH: 21
<212> TYPE: RNA
<213> ORGANISM: Artificial Sequence
<220> FEATURE:
<223> OTHER INFORMATION: siRNA

<400> SEQUENCE: 2
aattctccga acgtgtcacg t                                              21

<210> SEQ ID NO 3
<211> LENGTH: 19
<212> TYPE: RNA
<213> ORGANISM: Artificial Sequence
<220> FEATURE:
<223> OTHER INFORMATION: siRNA

<400> SEQUENCE: 3
caaccaaagt cgaatatga                                                 19

<210> SEQ ID NO 4
<211> LENGTH: 21
<212> TYPE: RNA
<213> ORGANISM: Artificial Sequence
<220> FEATURE:
<223> OTHER INFORMATION: sgRNA

<400> SEQUENCE: 4
gatggacgag tgcacggacg a                                              21

<210> SEQ ID NO 5
<211> LENGTH: 34
<212> TYPE: DNA
<213> ORGANISM: Artificial Sequence
<220> FEATURE:
<223> OTHER INFORMATION: primer

<400> SEQUENCE: 5
aagaatatca agatcatgag agggagccat cggg                                34

<210> SEQ ID NO 6
<211> LENGTH: 37
<212> TYPE: DNA
<213> ORGANISM: Artificial Sequence
<220> FEATURE:
<223> OTHER INFORMATION: primer

<400> SEQUENCE: 6
cgccgaggcc agatcctagg gcttttcaat ggacggg                             37

<210> SEQ ID NO 7
<211> LENGTH: 100
<212> TYPE: DNA
<213> ORGANISM: Homo sapiens

<400> SEQUENCE: 7
tgcagaagga gatcactgcc ctggcaccca gcacaatgaa gatcaagatc attgctcctc    60
ctgagcgcaa gtactccgtg tggatcggcg gctccatcct                         100

<210> SEQ ID NO 8
<211> LENGTH: 100
<212> TYPE: DNA
<213> ORGANISM: Homo sapiens

<400> SEQUENCE: 8

```
ccaatgcccg aatgccagag aaggtcacat ggatgaggag aatgaggatt ttgcgccggc    60
tgctcagaag ataccgtgaa tctaagaaga tcgatcgcca                        100

<210> SEQ ID NO 9
<211> LENGTH: 100
<212> TYPE: DNA
<213> ORGANISM: Homo sapiens

<400> SEQUENCE: 9
gaacgggaag cttgtcatca atggaaatcc catcaccatc ttccaggagc gagatccctc    60
caaaatcaag tggggcgatg ctggcgctga gtacgtcgtg                        100

<210> SEQ ID NO 10
<211> LENGTH: 100
<212> TYPE: DNA
<213> ORGANISM: Homo sapiens

<400> SEQUENCE: 10
tcttgatagg aaagtgtctg acctggagaa tgaagccaag aagcaggagg ctgccatcat    60
ggactataac cgagatatcg aggagatcat gaaggacatt                        100

<210> SEQ ID NO 11
<211> LENGTH: 100
<212> TYPE: DNA
<213> ORGANISM: Homo sapiens

<400> SEQUENCE: 11
ggtgcgcctg cccgggaaca tcctcctgga ctcaatcatg gcttgtggtc tggtcgccag    60
caacctgaat ctcaaacctg gagagtgcct tcgagtgcga                        100
```